United States Patent
Zhao et al.

(10) Patent No.: US 11,567,228 B2
(45) Date of Patent: Jan. 31, 2023

(54) ACOUSTIC DISPERSION CURVE IDENTIFICATION BASED ON RECIPROCAL CONDITION NUMBER

(71) Applicant: Halliburton Energy Services, Inc., Houston, TX (US)

(72) Inventors: Jiajun Zhao, Houston, TX (US); Ruijia Wang, Singapore (SG); Qingtao Sun, Spring, TX (US); Richard Timothy Coates, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/219,374

(22) Filed: Mar. 31, 2021

(65) Prior Publication Data
US 2021/0396901 A1  Dec. 23, 2021

Related U.S. Application Data

(63) Continuation of application No. PCT/US2020/038741, filed on Jun. 19, 2020.

(51) Int. Cl.
*G01V 1/50* (2006.01)
*G01V 1/28* (2006.01)

(52) U.S. Cl.
CPC ............... *G01V 1/50* (2013.01); *G01V 1/282* (2013.01); *G01V 2210/47* (2013.01); *G01V 2210/582* (2013.01); *G01V 2210/675* (2013.01)

(58) Field of Classification Search
CPC ...... G01V 1/50; G01V 1/282; G01V 2210/47; G01V 2210/582; G01V 2210/675
See application file for complete search history.

(56) References Cited

U.S. PATENT DOCUMENTS

| 6,631,327 | B2 | 10/2003 | Hsu et al. | |
| 6,675,892 | B2 * | 1/2004 | Kuchuk | E21B 47/06 166/252.1 |
| 6,718,266 | B1 | 4/2004 | Sinha et al. | |

(Continued)

OTHER PUBLICATIONS

PCT Application Serial No. PCT/US2020/038741, International Search Report, dated Mar. 5, 2021, 4 pages.

(Continued)

*Primary Examiner* — Elias Desta
(74) *Attorney, Agent, or Firm* — Delizio, Peacock, Lewin & Guerra

(57) ABSTRACT

To generate dispersion curves for acoustic waves in a radially layered system, a matrix M containing solutions to the wave equation subject to the boundary conditions of the system is constructed. The reciprocal condition number (RCN) of the matrix M is determined as a function of acoustic wave frequency and slowness. The local minima of the RCN in the frequency-slowness plane produces the dispersion curves corresponding to allowable acoustic modes in the system. A sensitivity analysis which identifies the dispersion curves dependent on a selected parameter. The dispersion curves independent of the perturbed parameters are eliminated by perturbing the modeling parameters and generating the RCN of the perturbed matrix M and then subtracting the RCN values of the unperturbed matrix M, leaving the dispersion curves that exhibit dependence on the selected parameter.

20 Claims, 8 Drawing Sheets

(56) References Cited

U.S. PATENT DOCUMENTS

| | | | |
|---|---|---|---|
| 7,042,802 | B2 | 5/2006 | Sinha |
| 7,120,541 | B2 | 10/2006 | Wang |
| 7,219,734 | B2 * | 5/2007 | Bai .................... E21B 43/2401 |
| | | | 166/57 |
| 7,257,489 | B2 | 8/2007 | Hsu et al. |
| 7,529,152 | B2 | 5/2009 | Sinha et al. |
| 7,660,196 | B2 | 2/2010 | Saiki et al. |
| 7,764,572 | B2 | 7/2010 | Wu et al. |
| 8,379,483 | B2 | 2/2013 | Tang et al. |
| 8,553,493 | B2 | 10/2013 | Wu et al. |
| 8,755,249 | B2 | 6/2014 | Aeron et al. |
| 9,086,508 | B2 | 7/2015 | Sinha et al. |
| 9,720,122 | B2 | 8/2017 | Difoggio |
| 9,732,607 | B2 | 8/2017 | Zeroug et al. |
| 9,746,568 | B2 | 8/2017 | Kinoshita et al. |
| 9,927,543 | B2 | 3/2018 | Wang et al. |
| 10,094,945 | B2 | 10/2018 | Khajeh et al. |
| 2005/0251342 | A1 | 11/2005 | Market et al. |
| 2008/0230221 | A1 * | 9/2008 | Zafari .................. E21B 49/008 |
| | | | 166/64 |
| 2013/0238248 | A1 | 9/2013 | Aeron et al. |
| 2015/0309200 | A1 | 10/2015 | Zharnikov et al. |
| 2016/0209538 | A1 | 7/2016 | Wang et al. |
| 2016/0334530 | A1 | 11/2016 | Syresin et al. |
| 2017/0115413 | A1 | 4/2017 | Wang et al. |
| 2018/0196156 | A1 | 7/2018 | Assous et al. |
| 2019/0129053 | A1 | 5/2019 | Wang et al. |
| 2019/0145241 | A1 | 5/2019 | Yao et al. |
| 2019/0154856 | A1 | 5/2019 | Valero et al. |
| 2019/0178078 | A1 | 6/2019 | Sakiyama et al. |
| 2019/0235109 | A1 | 8/2019 | Zhang et al. |

OTHER PUBLICATIONS

PCT Application Serial No. PCT/US2020/038741, International Written Opinion, dated Mar. 5, 2021, 4 pages.

Aeron, et al., "Robust Detection and Estimation for Logging While Drilling Monopole Acoustic Data", IEEE Transactions on Signal Processing, vol. 63, No. 12, pp. 3062-3075, Jun. 15, 2015, 25 pages.

Chen, et al., "Seismogram Synthesis for Radially Layered Media Using the Generalized 260 Reflection/Transmission Coefficients Method: Theory and Applications to Acoustic Logging", Geophysics, vol. 61, No. 4, pp. 1150-1159., 1996.

Cheng, et al., "Elastic Wave Propagation in a Fluid-Filled Borehole and Synthetic Acoustic Logs", Geophysics, vol. 46, No. 7, pp. 1042-1053, 1981.

Hager, "Condition Estimates", SIAM Journal on Scientific and Statistical Computing, vol. 5, No. 2, pp. 311-316, 1984.

Higham, et al., "A Block Algorithm for Matrix 1-norm Estimation, with an Application to 1-norm Pseudospectra", SIAM Journal on Matrix Analysis and Applications, vol. 21, No. 4, pp. 1185-1201, 2000.

Market, et al., "Dispersion Corrections Are Not Just for LWD Dipole Sonic Tools", Presented at the SPE Annual Technical Conference and Exhibition, SPE, 14 pages, 2006.

Tang, et al., "Quantitative Borehole Acoustic Methods", vol. 24: Elsevier, p. 34 only, 2004.

Tsang, et al., "Numerical Evaluation of the Transient Acoustic Waveform Due to a Point Source in a Fluid-Filled Borehole", Geophysics, vol. 44, No. 10, pp. 1706-1720, 1979.

Zhu, et al., "Experimental Studies of Monopole, Dipole, and Quadrupole Acoustic Logging While Drilling (LWD) with Scaled Borehole Models", Geophysics, vol. 73, No. 4, pp. E133-E143, 2008.

* cited by examiner $$M_n^m = \begin{bmatrix} \theta_{11} & \theta_{12} & \theta_{13} & \theta_{14} & \theta_{15} & \theta_{16} \\ \theta_{21} & \theta_{22} & \theta_{23} & \theta_{24} & \theta_{25} & \theta_{26} \\ \theta_{31} & \theta_{32} & \theta_{33} & \theta_{34} & \theta_{35} & \theta_{36} \\ \theta_{41} & \theta_{42} & \theta_{43} & \theta_{44} & \theta_{45} & \theta_{46} \\ \theta_{51} & \theta_{52} & \theta_{53} & \theta_{54} & \theta_{55} & \theta_{56} \\ \theta_{61} & \theta_{62} & \theta_{63} & \theta_{64} & \theta_{65} & \theta_{66} \end{bmatrix}$$

MATRIX EQUATION FOR BOUNDARY M AND SOURCE ORDER N 200

$$M = \begin{bmatrix} M_n^1 & \cdots & 0 & \cdots & 0 \\ \vdots & \ddots & \vdots & \cdots & \vdots \\ 0 & \cdots & M_n^l & \cdots & 0 \\ \vdots & \cdots & \vdots & \ddots & \vdots \\ 0 & \cdots & 0 & \cdots & M_n^m \end{bmatrix}$$

MULTI LAYER MATRIX 210

$$M = \begin{bmatrix} \begin{bmatrix} \theta_{11} & \cdots & \theta_{16} \\ \vdots & \ddots & \vdots \\ \theta_{61} & \cdots & \theta_{66} \end{bmatrix} & \cdots & 0 & \cdots & 0 \\ \vdots & \ddots & \vdots & \cdots & \vdots \\ 0 & \cdots & \begin{bmatrix} \theta_{hh} & \cdots & \theta_{h(h+5)} \\ \vdots & \ddots & \vdots \\ \theta_{(h+5)h} & \cdots & \theta_{(h+5)(h+5)} \end{bmatrix} & \cdots & 0 \\ \vdots & \cdots & \vdots & \ddots & \vdots \\ 0 & \cdots & 0 & \cdots & \begin{bmatrix} \theta_{(q-5)(q-5)} & \cdots & \theta_{(q-5)q} \\ \vdots & \ddots & \vdots \\ \theta_{q(q-5)} & \cdots & \theta_{qq} \end{bmatrix} \end{bmatrix}$$

GLOBAL MATRIX 220

FIG. 2

ACOUSTIC DISPERSION CURVE IDENTIFICATION BASED ON RECIPROCAL CONDITION NUMBER

TECHNICAL FIELD

The disclosure generally relates to the field of geophysics and to seismology and seismic and acoustic prospecting or detecting.

BACKGROUND

Acoustic prospecting of geological formations involves determining formation and reservoir characteristics based on propagation of acoustic waves into the formation and upon wavelength, amplitude, and speed of waves reflected from the formation. Dispersion curves, which are plots of slowness—the inverse of wave velocity—versus frequency for acoustic waves, illustrate allowable acoustic wave modes. Allowable acoustic waves are those which satisfy continuity of displacement and stress boundary conditions at interfaces where media or properties of media change in the system. For a wellbore modelled or approximated as a radially layered medium, these interfaces are a function of radius $r$ and relative azimuthal angle $\varphi$, independent of longitude $z$. In order to model a wellbore in a geological formation, the solutions of the acoustic wave equation or the equations describing the boundary conditions, such as the continuity of displacement and stress equations, are identified for the physical geometry of the model. Applying the continuity equations at the boundaries generates coupled equations used to solve the acoustic wave equations. A matrix containing elements corresponding to the linear or partial differential equations evaluated for each incoming and outgoing wave at each interface is generated, where each element is a function of slowness and frequency and corresponds to a term of the coupled equations and to a coefficient of the wave equation. Dispersion curves are where the matrix equation is solvable, as a function of slowness and frequency, and therefore represent the allowable acoustic waves. The full wave equation solution can then be determined along the dispersion curves, where the matrix is singular.

Measured acoustic dispersion curves are compared to the dispersion curves calculated based on the system or formation model. The formation models are adjusted to more closely mimic measured acoustic response. When the parameters of the wellbore are known, adjusting the corresponding model involves improving the model's coherence with the formation parameters. When the formation model accurately predicts the measured acoustic dispersion curves, detected acoustic waves correspond to analogous predicted waves—i.e. Stoneley, compressive, etc. Iteratively adjusting the formation model allows formation information to be extracted from measured acoustic waves, such as compressional speed of formation, shear wave speed of sound of formation, etc., and produces valuable petrophysical data for the formation, such as Young's modulus and other formation properties.

BRIEF DESCRIPTION OF THE DRAWINGS

Embodiments of the disclosure may be better understood by referencing the accompanying drawings.

FIG. 2 depicts example matrices containing the solutions to the wave equation.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to reciprocal condition number (RCN) in illustrative examples. Embodiments of this disclosure can be instead applied to alternate methods of determining matrix singularity. In other instances, well-known instruction instances, protocols, structures, and techniques have not been shown in detail in order not to obfuscate the description.

Overview

Modal solutions to the acoustic wave equation have been determined by solving for coefficients for which the determinant of the square matrix is zero in the frequency-slowness plane. When the determinant of the matrix is zero, the matrix is singular and solvable. However, solving such large matrices (as for when multiple thin layers are modeled) for non-trivial determinants involves significant computing power yet rarely identifies true zeros of the determinant. Solutions of such a determinant can also be unstable for systems with multiple layers.

By instead solving for singular values of the matrix or approximately singular values using the reciprocal condition number (RCN), improved dispersion curves are generated based on local minima in the RCN—where RCN is computed as a function of slowness and frequency. The 1-norm RCN measures the singularity of the matrix: RCN varies between zero for a completely singular matrix and one (or unity) for a completely solvable matrix. For low values, the matrix is more solvable and solutions to the acoustic wave equations tend to exist. The local minima of RCN mapped over slowness versus frequency generate the dispersion curves for the non-trivial solutions of the acoustic wave equations. The dispersion curves generated by the RCN method herein disclosed show more detail and generate more accurate dispersion curves, thus improving modeling and resolution of wellbore acoustics and comparison between measured acoustics and modeled acoustics.

Calculating dispersion curves based on RCN analysis further enable sensitivity analysis. By adjusting parameters for individual layers of the models and comparing generated dispersion curves, specific allowable acoustic modes can be correlated to a layer or layers in the model. Dispersion curves are determined to be either dependent on or independent of specific parameters, thus furthering knowledge of acoustic transmission in the wellbore.

Example Illustrations

Figure 1:
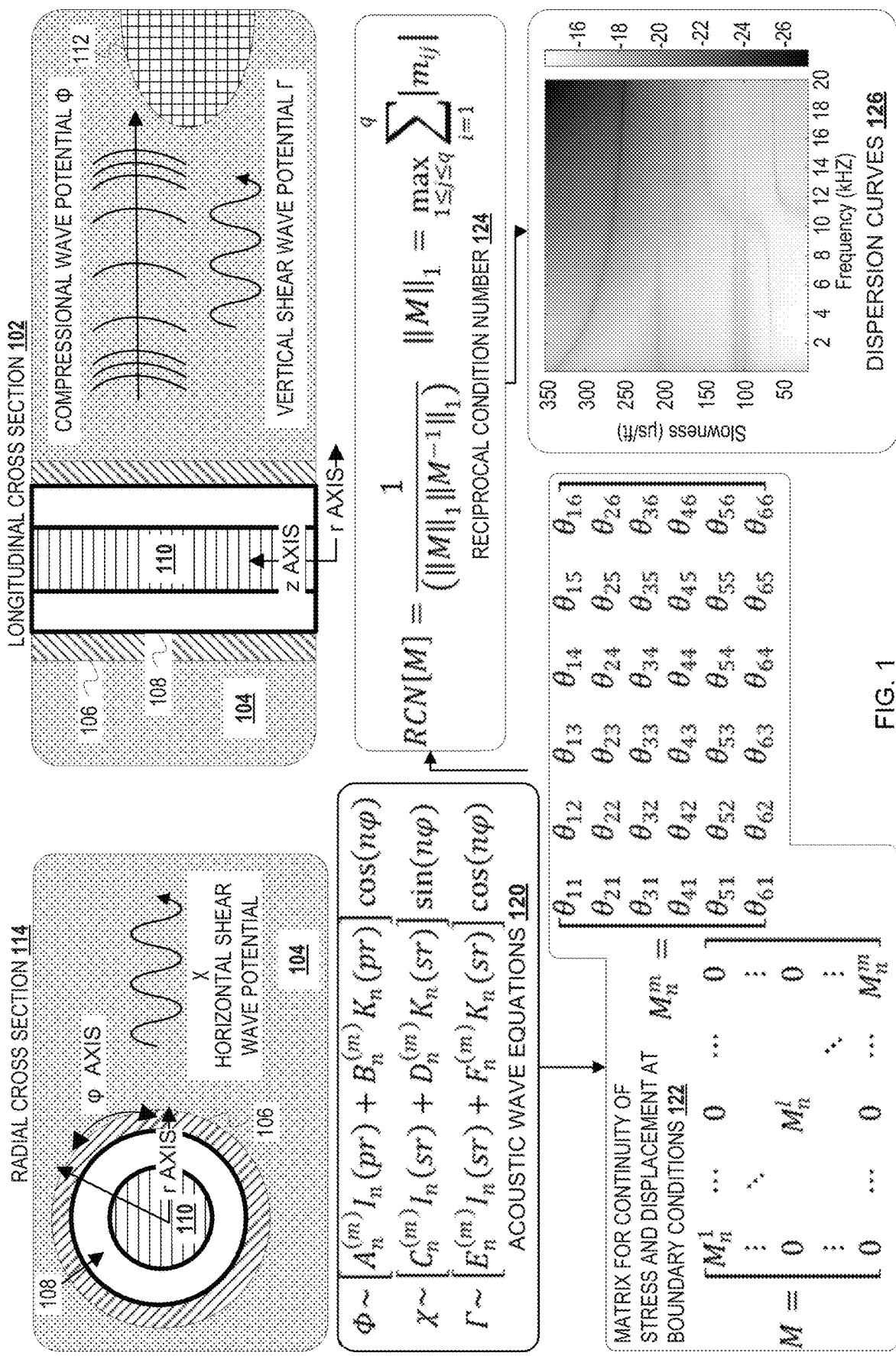
FIG. 1 depicts an example system for modeling acoustic waves in a wellbore.

FIG. 1 depicts an example system for modeling acoustic waves in a wellbore. Longitudinal cross section 102 depicts an example radially layered model of a wellbore and formation. The longitudinal cross section 102 includes a formation 104, a mud layer 106, an outer cavity 108 of a wellbore tool, and an inner cavity 110 of the wellbore tool. The outer cavity 108 is depicted as containing air, while the inner cavity 110 is depicted as containing water. The formation 104 includes a reservoir 112. Compressional wave potential $\Phi$ and vertical shear wave potential $\Gamma$ are depicted.

Radial cross section 114 depicts a portion of the same radially layered model as appears in the longitudinal cross section 102, including the formation 104, the mud layer 106, the outer cavity 108, and the inner cavity 110. The radial cross section 114 illustration includes a depiction of the horizontal shear wave $\chi$. The presumed wellbore tool corresponding to the inner and outer cavities 108, 110 is approximated as radially symmetric, while the formation 104 includes the reservoir 112 and is not radially symmetric.

Modeling of acoustic waves traveling in a borehole begins with the solution of the wave equation for a radially layered medium. Equation 1 describes the wave equation and Equation 2 describes the displacement solution of a particle u, where $\hat{z}$ is the z-direction (or out-of-plane) unit vector.

$$(\lambda+\mu)\nabla(\nabla \cdot \vec{u}) + \mu\nabla^2\vec{u} + \rho\omega^2\vec{u} + \rho\omega^2\vec{u} = 0 \quad \text{Eq. 1}$$

$$\vec{u} = \nabla\Phi + \nabla\times(\chi\hat{z}) + \nabla\times\nabla\times(\Gamma\vec{z}) \quad \text{Eq. 2}$$

The general solution can be written as three scalar fields, separable according to Helmholtz's theorem, and shown as Equations 3-5 below: $\Phi$ the compressional wave potential, $\chi$ the horizontal shear wave potential, and $F$ the vertical shear wave potential.

$$\Phi \sim [A_n^{(m)}I_n(pr) + B_n^{(m)}K_n(pr)]\cos(n\varphi) \quad \text{Eq. 3}$$

$$\chi \sim [C_n^{(m)}I_n(sr) + D_n^{(m)}K_n(sr)]\sin(n\varphi) \quad \text{Eq. 4}$$

$$\Gamma \sim [E_n^{(m)}I_n(sr) + F_n^{(m)}K_n(sr)]\cos(n\varphi) \quad \text{Eq. 5}$$

For Equations 3-5, r is the radial variable, $A_n^{(m)}$, $B_n^{(m)}$, $C_n^{(m)}$, $D_n^{(m)}$, $E_n^{(m)}$, and $F_n^{(m)}$ are unknown coefficients for source of order n (i.e. monopole, dipole, quadrupole, etc.) and layer m, $\varphi$ is the azimuthal angle. I and K are the first and second order modified Bessel functions, respectively. The compressional radial wave number is represented by p, and the shear radial wave number by s. The compressional and shear radial wavenumbers are related to each other in the k or wavenumber domain by Equations 6 and 7.

$$p = \sqrt{k^2 - k_\alpha^2} \quad \text{Eq. 6}$$

$$s = \sqrt{k^2 - k_\beta^2} \quad \text{Eq. 7}$$

$k_\alpha$ and $k_\beta$ are the compressional and shear wavenumbers where $\alpha$ and $\beta$ are the compressional and shear velocity and where Equations 8 and 9 hold.

$$k_\alpha = \frac{\omega}{\alpha} \quad \text{Eq. 8}$$

$$k_\beta = \frac{\omega}{\beta} \quad \text{Eq. 9}$$

Compressional and shear velocities are governed by material properties, including the first Lame's parameter ($\lambda$), density ($\varphi$, shear modulus ($\mu$) and are known for various wellbore materials. For isotropic and homogeneous materials, these relationships can be governed by Equations 10 and 11 below.

$$\alpha = V_p = \sqrt{\frac{\lambda + 2\mu}{\rho}} \quad \text{Eq. 10}$$

$$\beta = V_s = \sqrt{\frac{\mu}{\rho}} \quad \text{Eq. 11}$$

The unknown coefficients can be solved for by applying the continuity of stress and continuity of displacement boundary conditions at each interface (between radial layers) and writing the resultant system as a matrix equation, as shown in Equation 12.

$$Mx = 0 \quad \text{Eq. 12}$$

Continuity of the displacement vector $\vec{u}$, where $\vec{u} = (u_r, u_\theta, u_z)$, requires that radial, vertical, and horizontal components of displacement are continuous and, in particular, approach a single value from both sides of the boundary between layers. That is, for radially layered media, the right-hand and left-hand limits as r approaches a boundary between layers at r=R are equal as shown in Equation 13.

$$\lim_{r \to R^+} \vec{u} = \lim_{r \to R^-} \vec{u} = \lim_{r \to R} \vec{u} \quad \text{Eq. 13}$$

The three components of stress normal to the radial direction are given by Equations 14-16, which are the specific forms in cylindrical coordinates for the generalized stress tensor vector components shown in Equation 17.

$$\sigma_{rr} = (\lambda + 2\mu)\partial_r u_r \quad \text{Eq. 14}$$

$$\sigma_{r\theta} = \mu(\partial_r u_\theta + \partial_\theta u_r) \quad \text{Eq. 15}$$

$$\sigma_{rz} = \mu(\partial_r u_z + \partial_z u_r) \quad \text{Eq. 16}$$

$$\tau_{ij} = \sigma_{ij} = \lambda\delta_{ij}\left(\sum_k \partial_k u_k\right) + \mu(\partial_i u_j + \partial_j u_i) \quad \text{Eq. 17}$$

The full stress tensor matrix $\tau$, where elements are governed by Equation 17 above, is shown in Equation 18 below.

$$\tau = \begin{bmatrix} \tau_{rr} & \tau_{r\theta} & \tau_{rz} \\ \tau_{\theta r} & \tau_{\theta\theta} & \tau_{\theta z} \\ \tau_{zr} & \tau_{z\theta} & \tau_{zz} \end{bmatrix} = \begin{bmatrix} \sigma_{rr} & \sigma_{r\theta} & \sigma_{rz} \\ \sigma_{\theta r} & \sigma_{\theta\theta} & \sigma_{\theta z} \\ \sigma_{zr} & \sigma_{z\theta} & \sigma_{zz} \end{bmatrix} \quad \text{Eq. 18}$$

Continuity of strain along the radial direction, which holds for non-slipping layers, requires that the radial components of strain are continuous, even over boundaries between layers. Solutions to the wave equation involve evaluating the radial components of strain at boundaries and ensuring that each is continuous over the interface between layers.

Further boundary conditions govern the reflection versus transmission of waves across boundaries between layers. Reflection at boundaries creates incoming waves, where incoming waves carry information about the layers further out in the system. For formation seismic monitoring and modeling, the source and acoustic sensors are located in the inner layers of the wellbore. Acoustic waves travel outward from the source, into the formation, are reflected and travel inward to be measured at the acoustic sensors. Conservation of energy dictates that the energy stored in a wave incident on an elastic surface or boundary is conserved. The reflected waves and transmitted waves contain energy equal in total to the incident wave, for elastic boundaries. For a fluid system, the loss of energy to the system (in accordance with the third law of thermodynamics) must also be accounted for. This loss of energy to the system is approximated using the quality factor Q which can be determined for each material and accounted for as a system parameter. The quality factor Q also determines the decay of an acoustic wave, and is involved in evaluating boundary conditions.

If an acoustic source is present at position $(r,\theta,z)=(r_0,\theta_0,z_0)$, the acoustic source can be represented in k or frequency space as F(w) or as shown in Equation 19 below. The intensity of the acoustic source in three-dimensional space can fall off or dissipate in proportion to $1/r^3$ or $1/r^2 \cdot 1/2z$ or at another rate depending on the coordinate system used and on the elasticity of each boundary.

$$F(\omega) \propto f(\omega)\delta(r-r_0)\delta(z-z_0)\delta(\theta-\theta_0) \quad \text{Eq. 19}$$

A matrix M is generated which contains the coupled equations resulting from application of the continuity of displacement and stress to the m layer model. The coupled equations are factored in terms of the wave equation coefficients $A_n^{(m)}$, $B_n^{(m)}$, $C_n^{(m)}$, $D_n^{(m)}$, $E_n^{(m)}$, and $F_n^{(m)}$, each equation is then sorted into the matrix M. M is the global square matrix containing Bessel functions evaluated at the interfaces, and x is a column vector containing all the unknown coefficients for each layer of the model, as shown in Equation 12 above. Each row of M corresponds to the computation of either displacement or stress across an interface for a specific radius r. Each column of M corresponds to an incoming or outgoing wave in a layer m. For a single elastic material, M is a 6×6 matrix as shown in Equation 20, below.

$$M = \begin{bmatrix} \theta_{11} & \theta_{12} & \theta_{13} & \theta_{14} & \theta_{15} & \theta_{16} \\ \theta_{21} & \theta_{22} & \theta_{23} & \theta_{24} & \theta_{25} & \theta_{26} \\ \theta_{31} & \theta_{32} & \theta_{33} & \theta_{34} & \theta_{35} & \theta_{36} \\ \theta_{41} & \theta_{42} & \theta_{43} & \theta_{44} & \theta_{45} & \theta_{46} \\ \theta_{51} & \theta_{52} & \theta_{53} & \theta_{54} & \theta_{55} & \theta_{56} \\ \theta_{61} & \theta_{62} & \theta_{63} & \theta_{64} & \theta_{65} & \theta_{66} \end{bmatrix} \quad \text{Eq. 20}$$

The six rows of M correspond to each one of the components of displacement along each of the three orthogonal directions (for example radial $\vec{r}$, azimuthal $\vec{\theta}$, and vertical $\vec{z}$ components in cylindrical coordinates) and to the components of stress along each of the three orthogonal directions ($\sigma_{rr}$, $\sigma_{r\theta}$, $\sigma_{rz}$). The six columns correspond to the six incoming and outgoing waves across the boundary: incoming compressional, outgoing compressional, incoming horizontal shear wave, outgoing horizontal shear wave, incoming vertical shear wave, and outgoing vertical shear wave. Where the matrix M is singular (i.e. for values of frequency and slowness where M is singular), solutions to the wave equation exist. The full wave equation solution involves solving both for M and then for the wave equation coefficients $A_n^{(m)}$, $B_n^{(m)}$, $C_n^{(m)}$, $D_n^{(m)}$, $E_n^{(m)}$, and $F_n^{(m)}$, but much information about the acoustic waves can be determined from M alone without solving for the coefficients.

FIG. 2 depicts example matrices containing the solutions to the wave equation. Matrix $M_n^m$ 200 represents a single, elastic layer condition and is a 6×6 matrix. For a model with m layers, the square matrix M is approximately a 6m×6m matrix (the square matrix M may have smaller dimensions if some boundaries or layers are not elastic). Multi-layer matrix 210 represents the construction of a global matrix based on the solutions to the wave equation for each of m layers, where 0≤l≤m. Global matrix 220 represents the full solution to the wave equations for a system with m layers. Global matrix M 220 represents a diagonal matrix of the M matrices corresponding to each of the m layers of the system, where 0<l<m, and is composed of the components $\theta_{ij}$, where 1<h<q, of for each of the m layers.

The matrix M becomes complicated quickly as layers and real-world non-idealities are included, as is shown in FIG. 2. Matrix M is sparse—that is many elements are zero, especially away from the diagonals—but the determinant is not easily calculable. Matrix M is not diagonal, because each diagonal element (i.e. WO) is itself a 6×6 matrix (or smaller for inelastic boundaries), but more closely resembles a band matrix. Matrix M may or may not be singular (that is invertible, where matrices are either singular or invertible) because the determinant of M is not limited to a value of zero for all values of velocity (or slowness) and frequency.

The column vector x contains the unknown coefficients for each of m layers, where each layer corresponds to six coefficients as shown for the most general case in Equation 21, below.

$$x^{(m)} = \begin{matrix} A_n^{(m)} \\ B_n^{(m)} \\ C_n^{(m)} \\ D_n^{(m)} \\ E_n^{(m)} \\ F_n^{(m)} \end{matrix} \quad \text{Eq. 21}$$

Solving Equation 12 where M x=0 gives the modal wave solution, where modal solutions are of particular interest as transmittable acoustic waves. The absolute value of the determinant of matrix M, as shown in Equation 22 below, can be used to determine where nontrivial solutions of Equation 12 exist.

$$|\det(M)|=0 \quad \text{Eq. 22}$$

Because M contains complex values (as provided by the Bessel functions), the absolute value of det(M) is used, where M is calculated as a function of slowness and frequency.

In theory, the existence of a nontrivial solution to Equation 12 indicates that M is singular. However, due to factors such as computational limitations and the presence of imaginary portion of M, the magnitude of the absolute value of the determinant of M (i.e. |det (M)|) does not correlate directly to the Ms invertibility, where invertible matrices are not singular. An infinitesimal determinant does not imply that matrix M is singular. For instance, any scalar a matrix M and matrix a*M should have the same invertibility, i.e. approximately the same degree of singularity whether singular or invertible. However, for $|a|<<1$ where q is the dimension of square matrix M Equation 23 holds.

$$|\det(a*M)|=|a|^q|\det(M)|<<|\det(M)| \quad \text{Eq. 23}$$

This multiplicative relationship shows that the absolute value of the determinant alone is not a good measure of the matrix's singularity—especially when the matrix is close to but not exactly singular. For complex systems, the determinant is solved for numerically. Traditional numerical solutions, including lower-upper (LU) factorization, can lead to instabilities—particularly in large systems, those with very distant boundaries, or for high frequencies. Such numerical instabilities can obscure singularities in matrix M The absolute value of the determinant method, alone, does not completely capture the matrix's singularity.

Condition number is a measure of how quickly a function output value changes for small changes in input values. For a matrix containing the solution to a linear equation, the condition number measures how inaccurate the solution is after approximation. Conditioning is inherent to the matrix, and functions, in addition to computational limitations, to induce solution errors. For matrices with small condition numbers, solutions are more accurate. The RCN, as will be defined in Equation 24, contains a measure of the condition number of matrix M and the condition number of its inverse in the denominator.

The singularity of matrix M can therefore be measured by an application of either the condition number or the reciprocal condition number (hereafter RCN) as a more stable alternative to the determinant method previously discussed. The RCN for a matrix M is a real number where $0 \leq RCN \leq 1$ and is defined by Equation 24, below. For the RCN approaching zero (i.e. as the condition number approaches large or infinite values), the matrix M is close to singular. An RCN of zero corresponds to a completely singular matrix. For the RCN approaching unity (i.e. as the condition number approaches one), the matrix M approaches solvability. An RCN of one corresponds to a matrix M representing a completely solvable system of linear equations.

$$RCN[M] = \frac{1}{(\|M\|_1 \|M^{-1}\|_1)} \quad \text{Eq. 24}$$

The RCN depends on the 1-norm of the matrix (and that of its inverse), where the 1-norm of a matrix is given by the relationship shown in Equation 25 below, for a q dimension square matrix M (a q×q matrix) where $m_{ij}$ is the matrix element in row i and column j.

$$\|M\|_1 = \max_{1 \leq j \leq q} \sum_{i=1}^{q} |m_{ij}| \quad \text{Eq. 25}$$

If $M^{-1}$ is known, then $\|M^{-1}\|_1$ is calculable. If the inverse of matrix M is not known, then $\|M^{-1}\|_1$ can be estimated from M and the factors of M by solving the system of Equations 26 and 27, below, to give the relationship shown in Equation 28. This allows $\|M^{-1}\|_1$ to be calculated iteratively, without requiring exact knowledge of the inverted matrix. Vector $\vec{b}$ is chosen such that it "enhances" or maximizes the growth of selected $\vec{x}$ during the substitution.

$$M^T \vec{x} = \vec{b} \quad \text{Eq. 26}$$

$$M \vec{y} = \vec{x} \quad \text{Eq. 27}$$

$$\|M^{-1}\|_1 \sim \frac{\|y\|_1}{\|x\|_1} \quad \text{Eq. 28}$$

Further, as originally developed by Hager ("Condition estimates") in 1984 and expanded upon by Higham and Tisseur ("A block algorithm for matrix 1-norm estimation with an application to 1-norm pseudospectra") in 2000, this can be solved for as a convex optimization problem where a $\vec{x}$ is chosen to maximize Equation 29 subject to the limitations of Equation 30.

$$\phi_s = \max\{\|M^{-1}x\|_1\} \quad \text{Eq. 29}$$

$$\|x\|^1 = 1 \quad \text{Eq. 30}$$

RCN, which is estimable, is a better measure of matrix singularity than the absolute value of the determinant method, because of both stability and calculation considerations. Further, the RCN method described previously, produces refined dispersion curve estimates and allows for deeper understanding of the relationship between acoustic waves and wellbore and wellbore tool geometry.

Additionally, the condition number of matrix M can be used in place of the RCN. The condition number and the reciprocal condition number are inversely related. Where the condition number is 1, M is a scalar multiple of a linear isometry. For a singular matrix, the condition number approaches infinity. The condition number of any matrix multiplied by a scalar is the condition number of the matrix—that is neither the condition number nor the RCN are affected by multiplying the matrix M by any scalar a but rather remain constant and as such, are a good measure how close to singular matrix M is. The condition number can be calculated using Equation 31, below. Hereafter any mention of the reciprocal condition number (RCN) also encompasses using the condition number (CN) as well or instead, or calculating the condition number directly and then using the calculated CN in order to generate the RCN for any matrix M as a function of frequency and slowness. Local maxima of the CN of M in the frequency-slowness plane represent dispersion curves based on the CN, where $1 \leq CN \leq \infty$ (while $0 \leq RCN \leq 1$).

$$CN[M] = \|M\|_1 \|M^{-1}\|_1 \quad \text{Eq. 31}$$

Figure 3:
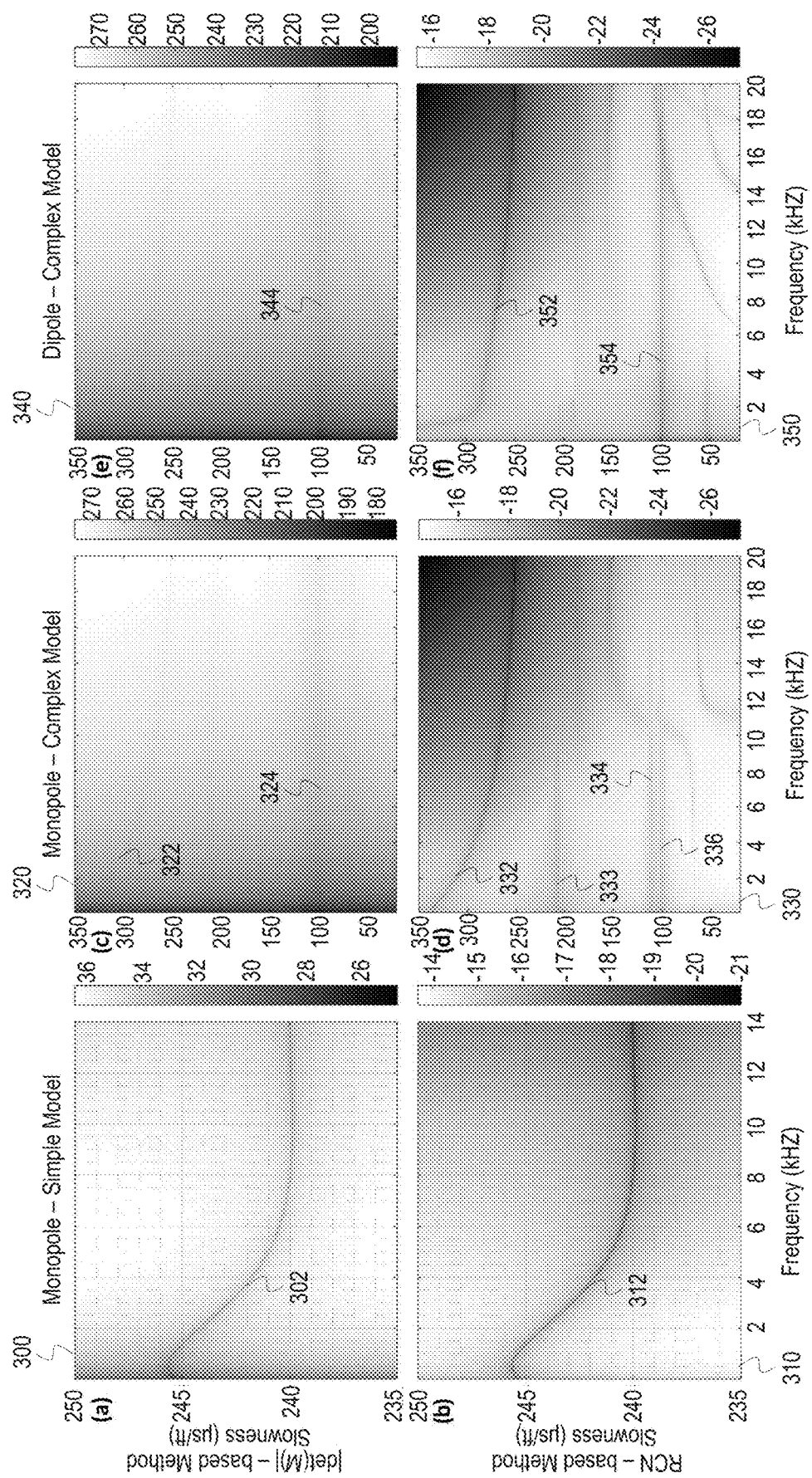
FIG. 3 depicts example dispersion curves generated by the RCN method and dispersion curves generated by the determinant method.

FIG. 3 depicts example dispersion curves generated by the RCN method and dispersion curves generated by the determinant method. The global matrix M was generated for many points for two different physical models, where each point represents a single acoustic frequency (w) and slowness value (where slowness is the inverse of velocity). The absolute value of the determinant was calculated and plotted along the intensity scale as $\log\{|\det[M]|\}$ (the base 10 log of the absolute value of the determinant of matrix M), which generates the dispersion curves. The dispersion curves, which depict allowable wave velocities as a function of frequency, appear as continuous low intensity or minima curves across various values of both slowness and frequency. Dispersion curves generated by the RCN method, where $\log\{|RCN[M]|\}$ is plotted are also shown.

Both the determinant method and the RCN method are displayed as intensity values corresponding to the logarithm of the function of M. The intensity scales are different for log $\{|\det[M]|\}$ and $\log\{|RCN[M]|\}$, as would be expected for different functions. Further, |det[M]| can be scaled arbitrarily (as shown in Equation 23)—relative magnitude of log{|det[M]|} generates quantifiable dispersion curves, not absolute magnitude. Neither logarithmic quantity itself is important, but rather the dispersion curves that appear as local minima correspond to quantifiable physical relationships.

Graph 300 depicts the value of log{|det[M]|} as intensity for values of slowness between 235 and 250 µs/ft and for values of frequency between 0 and 14 kHz for a simple model of an empty borehole and surrounding formation. The modeled excitation source is a monopole acoustic source. Curve 302 represents the local minima plotted for the solution matrix M and corresponds to the Stoneley surface wave propagating between the drilling mud and formation.

Graph 310 depicts the value of log{|RCN [M]|} as intensity over the values of slowness between 235 and 250 µs/ft and for values of frequency between 0 and 14 kHz for the same simple empty borehole and formation model and monopole wave source. Curve 312 represents the local minima of the solution matrix M for the simplified borehole model and corresponds to the Stoneley surface wave propagating along the interface between the drilling mud and the formation.

The Stoneley wave curves of the graph 300 (the curve 302) and the graph 310 (the curve 312) are substantially identical. This validates the RCN method as a method for generating dispersion curves. The advantages of the RCN method become more apparent in more complex models.

Graph 320 depicts the value of log{|det[M]|} on the intensity scale for values of slowness between 0 and 350 µs/ft and for values of frequency between 0 and 20 kHz for a multi-component radially layered model such as that depicted in FIG. 1. This complex model includes seven layers, listed as layer 1-7 together with their properties in Table 1 (further below), and corresponding to an approximation of a wellbore tool, mud, and a formation. The wellbore tool is approximated by layers 1-5 of Table 1: water, an inner steel layer, air, and outer steal layer, and a heavy-slow approximation layer. In the graph 320, curve 324 represents the local minima plotted for the solution matrix M and corresponds to compressional velocity of the formation. The graph 320 contains more modes—is more complex—than graph 300. Curve 322 represents the Stoneley wave of the complex model and it similar in shape to the curve 302 in the graph 300 of the simple model. The difference between these two curves is arises due to model complexity and graphing scale. The added complexity and the larger size of the matrix M representing the complex system generates multiple curves as opposed to the single curve visible in the graph 300 for the simple model.

Graph 330 depicts, on the intensity axis, the value of log{|RCN[M]|} over the values of slowness between 0 and 350 µs/ft and for values of frequency between 0 and 20 kHz for the same complex wellbore tool, borehole and formation model and monopole wave source used to produce the graph 320. Curve 332 represents a local minima of the solution matrix M for the complex borehole model and corresponds to the Stoneley wave propagating along the interface between the drilling mud and the formation. Curve 333 corresponds to the local minima representing the inner Stoneley wave—the Stoneley wave propagating along the surface of the tool as the tool-drilling mud boundary. Curve 334 corresponds to speed of sound in the formation. An additional curve, curve 336, appears at approximately 100 µs/ft and reflects the formation compressional head wave. A compressional head wave is generated when the compressional wave velocity is faster than the fluid compressional speed and travels through fluids at a highly refracted angle.

The graph 330 provides more details—more information about dispersion curves—than the graph 320. The RCN method, because of its greater computational power, determines local minima and dispersion curves that are hidden by approximation and computational limits of the determinant method. Further, the RCN method is more balanced in amplitude than the determinant method. Several of the clear curves in the graph 330 (the curve 332 of the outer Stoneley wave, the curve 333 of the inner Stoneley wave, etc.) are faintly visible or potentially determinable in the graph 320. Because the determinant method, with an applied logarithmic filter, does not directly correlate to a measure of singularity (i.e. |det[M]| is not proportional to a measure of how singular M is), intensity of the dispersion curves corresponding to various modes are unequal. In the RCN method, background amplitude is relatively consistent and the dispersion curves are detectable at around the same intensity, above the background noise. The value of RCN is roughly proportional to a measure of singularity, so outside of the dispersion curves (which are local minima and areas of increased singular-ness) the RCN approaches a consistent background magnitude. To identify secondary dispersion curves via the determinant method requires further filtering and de-noising, because the value of the determinant of M is not proportional to how singular the matrix M is.

Graph 340 depicts the value of log{|det[M] I} on the intensity scale for values of slowness between 0 and 350 µs/ft and for values of frequency between 0 and 20 kHz for the multi-component radially layered model as exposed to a dipole acoustic source. Curve 334 represents the local minima plotted for the solution matrix M corresponding to the compressional velocity of the formation.

Graph 350 depicts, on the intensity axis, the value of log{|RCN[M]|} over the values of slowness between 0 and 350 µs/ft and for values of frequency between 0 and 20 kHz for the same complex wellbore tool, borehole and formation model and dipole wave source used to produce the graph 340. Curve 352 represents local minima of the solution matrix M for the complex borehole model corresponding to the outer Stoneley wave propagating along the boundary between the drilling mud and the formation. The inner Stoneley wave—the Stoneley wave propagating along the surface of the tool as the tool-drilling mud boundary—appears below the curve 352 but is not as pronounced as the curve 333 of graph 330. Curve 354 corresponds directly to the compressional slowness in the formation and inversely to the compressional speed of sound in the formation. Again, the graph 350 is clearer and provides more information about the dispersion relationship in the modeled wellbore system than the graph 340 based on the determinant method. Wave modes are more clearly defined and dispersion curves are visibly distinct from background noise.

Table 1 shows modeling parameters for use with the previously described method. The simple model, which is used to generate the graphs 300 and 310 is based on a model including only two layers—layer 6, mud, and layer 7, the formation. The complex model, which is used to generate the graphs 320, 330, 340, and 350, includes the calculation of matrix M based on solutions to the wave equation for all seven radially layered media.

TABLE 1

Model parameters for a radially layered medium as shown in FIG. 1.

| Layer No. | 1 | 2 | 3 | 4 | 5 | 6 | 7 |
|---|---|---|---|---|---|---|---|
| Description | Water | Inner steel | Air | Outer Steel | Heavy-slow | Mud | Formation |
| $V_p$ (m/s) | 1500.00 | 5790.00 | 331.00 | 5790.00 | 1000.00 | 1500.38 | 2965.74 |
| $\Delta T_p$ (μs/ft) | 203.20 | 52.64 | 920.85 | 52.64 | 304.80 | 203.15 | 102.78 |
| $Q_p$ | 100 | 100 | 2 | 100 | 100 | $+\infty$ | $+\infty$ |
| $V_s$ (m/s) | 0.00 | 3100.00 | 0.00 | 3100.00 | 500.00 | 0.00 | 1629.49 |
| $\Delta T_s$ (μs/ft) | $+\infty$ | 98.32 | $+\infty$ | 98.32 | 609.60 | $+\infty$ | 187.05 |
| $Q_s$ | 100 | 10 | 2 | 50 | 100 | $+\infty$ | $+\infty$ |
| ρ (kg/m³) | 1000.00 | 7900.00 | 1.29 | 7900.00 | 21000.00 | 1000.00 | 1850.00 |
| R (m) | 0.024384 | 0.056388 | 0.058928 | 0.088146 | 0.091021 | 0.107950 | $+\infty$ |

Slowness is the inverse of velocity and is a measure of the speed at which a wave promulgates. The industry standard units for slowness are μs/ft (microsecond per foot), but other units can be used. The equations for slowness versus velocity for compressional waves ($\Delta T_p$ and $V_p$) and shear waves (ATs and Vs) are shown below, where $V_p$ and Vs are the shear wave velocity and compressional wave velocity for a specific material (where $V_p$=α and $V_s$=β as shown in Equations 32 and 33).

$$\Delta T_p = \frac{1}{V_p} \quad \text{Eq. 32}$$

$$\Delta T_s = \frac{1}{V_s} \quad \text{Eq. 33}$$

Quality factor Q, a dimensionless parameter, describes the rate at which the waves dissipate. Q is defined as the ratio between the maximum energy potential stored per wave cycle to the energy lost per radian of the cycle and can be frequency dependent. In seismic and acoustic waves, Q represents a measure of how fast compressional and shear waves die out over time. In the frequency domain, Q can be represented by Equation 34 below, where $f_r$ and $\omega_r$ are the resonance frequency and angular resonance frequency, respectively, Δf is the resonance width or full width at half maximum (FWHM), and Δω is the angular half-power bandwidth. Quality factor Q can also vary as a function of frequency.

$$Q = \frac{f_r}{\Delta f} = \frac{\omega_r}{\Delta \omega} \quad \text{Eq. 34}$$

Figure 4:
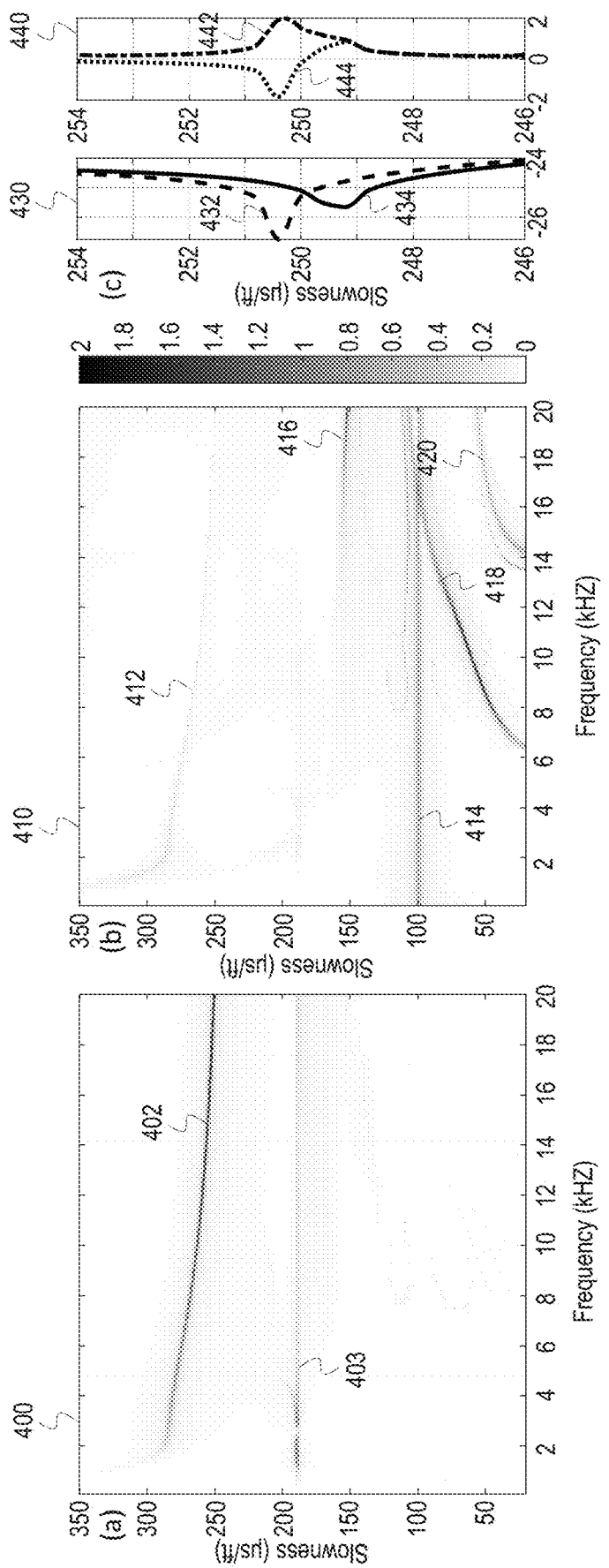
FIG. 4. depicts dispersion curve sensitivity analysis based on the RCN dispersion curve generation method.

FIG. 4 depicts dispersion curve sensitivity analysis based on the RCN dispersion curve generation method. The sensitivity analysis curves displayed in FIG. 4 correspond to a complex multi-layer model and dipole acoustic source—the model that also produced the graph 350 in FIG. 3. Sensitivity analysis is a method of determining which dispersion curves depend on which modeling parameters and which dispersion curves are independent of any individual parameter.

In order to determine the relationship between modeling parameters—which may be formation parameters, wellbore geometry parameters, material parameters, etc.—and individual dispersion curves, a sensitivity analyzer performs a multi-step perturbation and analysis. The sensitivity analysis involves a first calculation of the dispersion curves, based on the modeling parameters (such as those shown in Table 1). Once the dispersion curves have been calculated, a modeling parameter or parameters are chosen, and their values perturbed. The perturbation can be as small, approximately 1%. Using the new perturbed parameter values and the other original parameter values, the dispersion curves are re-calculated using the RCN method. The two-dimensional map (in the frequency versus slowness domain) of the RCN intensity of the perturbed system is then subtracted from the RCN intensity map of the original system. The subtraction produces a map of dispersion curve differences due to the perturbation—which contains the dispersion curves that are dependent on the perturbed parameter and were therefore altered by the perturbation.

Graph 400 shows the results of a sensitivity analysis in which the formation shear slowness parameter was varied. Varying the formation shear slowness, parameter $\Delta T_s$ for the formation layer (layer 7) as shown in Table 1, by a small amount alters certain of the dispersion curves, which appear in the graph 400 as curve 402 and curve 403. The curve 402 corresponds to the outer Stoneley dispersion curve (the flexural wave) over bandwidth between 3 and 20 kHz, while the curve 403 corresponds to the formation shear head wave, with a particularly strong dependence at low frequencies. Both of these dispersion curves should depend on the formation shear slowness, as the sensitivity analysis shows. Other curves present in the graph 350 of FIG. 3 are missing from the graph 400 or have no analog—these are the dispersion curves that do not depend on or are independent of the formation shear slowness parameter.

Graph 410 shows the results of a sensitivity analysis in which the shear slowness of the outer steel layer of the wellbore tool, which may be a logging while drilling (LWD) or measuring while drilling (MWD) tool, is varied. Curve 412, which corresponds to the outer Stoneley dispersion curve, is not as intense as the curve 402 of the graph 400 but is visible over the background. Curve 414 corresponds to the compressional formation slowness, which also appears as curve 354 in the graph 350 of FIG. 3. Additionally, curves 416, 418, and 420 appear to correspond directly to dispersion curves present in the graph 350 of FIG. 3 for slowness below 150 μs/ft and frequencies above 6 kHz. Some curves, like the formation shear slowness curve that appears as the curve 403 in the graph 400, from the graph 350 of FIG. 3 have no analog in the graph 410. These are the dispersion curves that are not dependent on the shear slowness of the outer steel layer of the wellbore tool.

In this example, most of the curves present in the graph 350 of FIG. 3 appear in either the graph 400, where dispersion curves dependent on the formation shear slowness appear, or in the graph 410, where dispersion curves dependent on the wellbore tool outer steel shear slowness appear. The Stoneley dispersion curve appears in both the graph 400 and 410. The two parameters chosen for sensitivity analysis here happen to contain (additively) most of the curves present in the graph 350 of FIG. 3—this is not true for any two chosen perturbation parameters. Rather, most of the dispersion curves result either from the properties of the formation or the properties of the wellbore tool, so selecting a parameter integral to each will result in a large portion of the dispersion curves exhibiting dependence on one or another.

Graph 430 depicts the intensity versus slowness at 20 kHz for the sensitivity analysis of formation shear slowness shown in the graph 400. Curve 434 represents the original value of the RCN method (log $\{|RCN[M]|\}$) at a frequency of 20 kHz for slowness between 246 and 254 μs/ft. Curve 432 represents the value of the RCN method once the formation shear slowness was perturbed. The graph 430 is an enlargement of a portion of the graph 400 where it is visible that a perturbation of the formation shear slowness of approximately 1% causes the peak in intensity of the outer Stoneley dispersion curve to move from approximately 249 μs/ft to 250.5 μs/ft at the given frequency. The perturbation of the formation shear slowness results in a perturbation to the location of the dispersion curve, which reveals the dependence of the inner Stoneley dispersion curve of the formation shear slowness.

Graph 440 depicts difference curve 444 and envelope curve 442, which are methods of quantifying the resultant change in dispersion curves due to parameter perturbation during sensitivity analysis. The difference curve 444 represents difference between or subtraction of the curve 432 (of the perturbation) and the curve 434 (of the originally modeled RCN method) of the graph 430. The envelope curve 442 represents the envelope of the two curves (the curve 432 and the curve 434).

The RCN method produces more accurate dispersion curves that require less computational time and power than the determinant method, allowing more granular calculations. The RCN method is particularly useful in processing acoustic data, i.e. borehole sonic data, and dispersion curves measured experimentally in real world wellbores (i.e. field data or field measured dispersion curves) and wellbore applications. The RCN method can be used to quality control experimental dispersion curves—to ensure that measured dispersion curves correspond to the wellbore and formation system geometry and are not noise artifacts, transmission line artifacts, or too noisy to contain useful data. Further, the RCN method can be used to test wellbore tool design. Modeling of wellbore tools, including their acoustic properties, before fabrication or deployment ensures that the allowed vibrations or harmonics of the wellbore tool itself do not obscure important formation information. A wellbore tool with a harmonic or resonance frequency at or around the expected formation shear head wave, for instance, would generate interference with acoustic modes reflected from the formation back towards the wellbore tool and sonic sensors.

Figure 5:
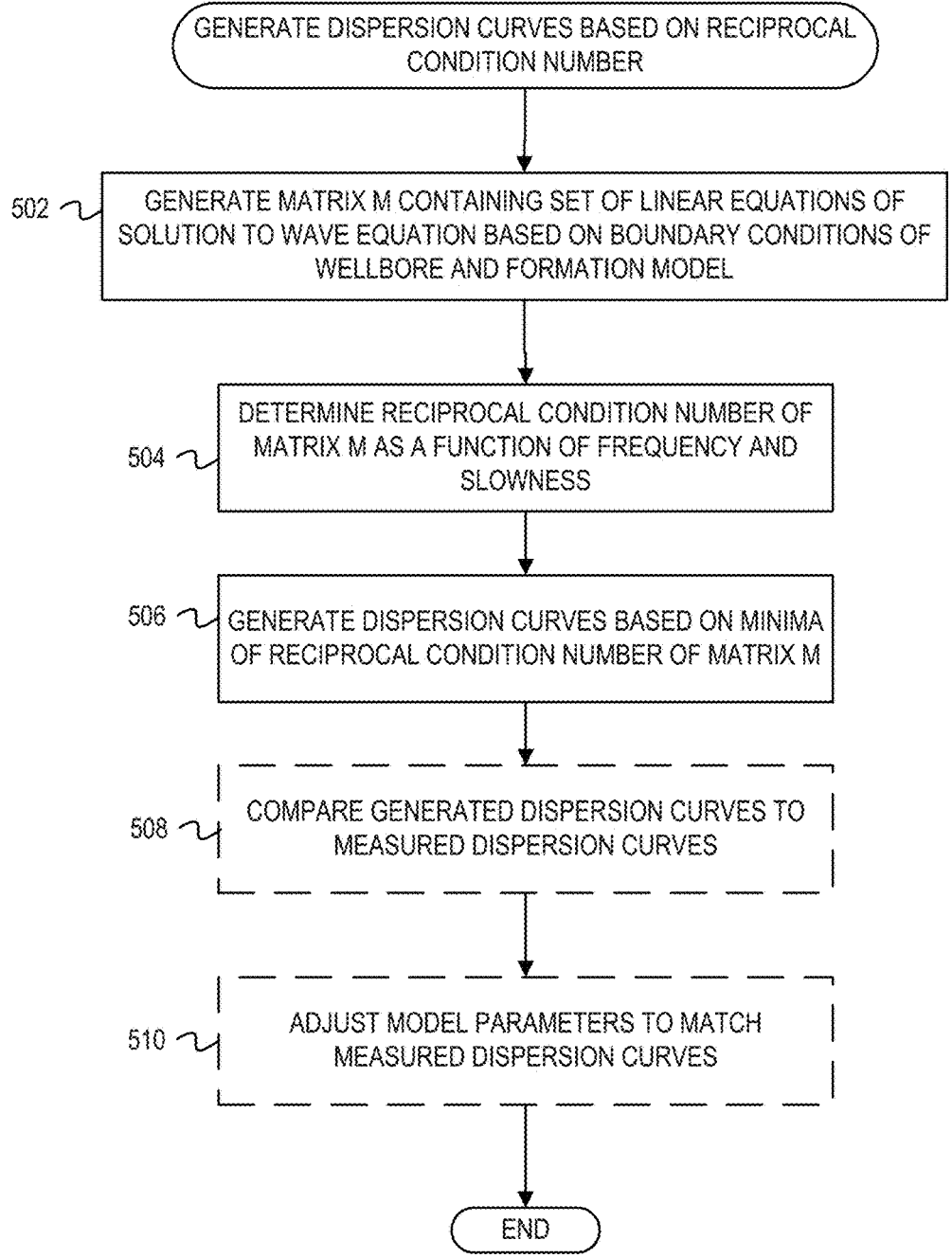
FIG. 5 is a flowchart of example operations for generating dispersion curves based on the reciprocal condition number.

FIG. 5 is a flowchart of example operations for generating dispersion curves based on the reciprocal condition number. The operations are described as being performed by a dispersion curve generator. However, program code naming, organization, and deployment can vary due to arbitrary programmer choice, programming language(s), platform, etc. The dispersion curve generator can be a processor, program code that generates dispersion curves as solutions to the wave equations or a computational, modeling, or analysis program that includes or invokes the program code for generating dispersion curves.

At block 502, the dispersion curve generator generates a matrix M containing solutions to the wave equation for an m layer system based on boundary conditions of a wellbore, corresponding formation and layer material properties. The matrix M is generated based on the linear algebra solution to the continuity of displacement and continuity of stress equations for the boundary conditions between each of the m layers. Matrix M depends on the material parameters for each layer of the modeled system: shear slowness, compressional slowness, quality factor, thickness, density, radius, compressional velocity, shear velocity, etc. The dispersion curve generator calculates the matrix M or receives it as an input from another program, where the elements of M depend on slowness and acoustic frequency.

At block 504, the dispersion curve generator calculates the reciprocal condition number as a function of slowness and frequency. The dispersion curve generator calculates the reciprocal condition number (RCN) based on the relationship shown in Equations 24 and 25. The inverse of the matrix M may be directly calculated for invertible matrices but can also be approximated. The 1-norm of the inverse of matrix M (i.e. $\|M^{-1}\|_1$) can also be approximated without approximating the entire inverse matrix (i.e. $M^{-1}$) as is detailed in Equations 26-30. The dispersion curve generator determines a range of slowness values and a range of frequencies and a sampling rate. The frequency range can be determined based on user input or based on frequency ranges typical for wellbore acoustic sources. The frequency range can start at or near 0 kHz and be determined by user input of an upper range. The frequency range may also be determined by the sensitive range of a typical or known acoustic sensor. The dispersion curve generator also determines a range of slowness values, which can be selected based on user input, can be determined based on material properties, or can start at or near 0 μs/ft and range to a pre-selected upper bound. The dispersion curve generator can select an upper bound based on the largest slowness (i.e. the inverse of the smallest compressional or shear velocity) of the materials included in the model or based on the formation shear slowness or another formation property. If the largest slowness is used, the dispersion curve generator can select a slowness range equal to a percentage of the largest slowness, such as 80% of the compressional shear slowness. The sampling rate can be user selected, or determined based on the inverse of the ranges such that total calculation time remains constant. The sampling rate can also vary based on the detected dispersion curves. The dispersion curve generator can sample the entire frequency-slowness space contained within the ranges for frequency and slowness at a survey sample rate, and then calculate the RCN of matrix M at a higher rate where local minima appear in order to better define the dispersion curves.

At block 506, the dispersion curve generator generates the dispersion curves based on the values of the RCN of M. The dispersion curves can be displayed as plots of RCN (or of a function of RCN such as log$\{|RCN[M]|\}$) or can be stored and analyzed as a data set or sets. The dispersion curve generator can filter or otherwise remove background in order to identify the dispersion curves as a function of the value of the RCN of M over the range of frequency and slowness. The dispersion curve generator can identify dispersion curves as local minima in RCN (or log$\{|RCN[M]|\}$) and calculate or fit equations for the dispersion relationship as a function of frequency (w) and slowness (in μs/ft or other units or as a function of the inverse of velocity 1/v).

The dispersion curve generator can also iteratively refine both the variable ranges and the sampling interval based on identified dispersion curves and their continuity. For example, for sampling intervals that produce discontinuous Stoneley wave dispersion curves the dispersion curve generator can detect that there is insufficient resolution and re-calculate the dispersion curves at a smaller sampling interval until the dispersion curves meet a minimum continuity. Smaller sampling intervals and larger ranges for frequency and slowness increase the computational power and time necessary to calculate the RCN values of M, so the dispersion curve generator balances computational time versus sampling density.

At block 508, the dispersion curve generator optionally compares the dispersion curves generated by the RCN method with the dispersion curves based on wellbore measurements. The dispersion curve generator can perform analysis of wellbore acoustic response as a function of acoustic wave frequency and arrival time (or velocity). A separate program can create experimental dispersion curves from experimental data and the dispersion curve generator can compare the calculated experimental dispersion curves to the generated dispersion curves based on the wellbore model. When the dispersion curve generator operates on a model with wellbore parameters, such as layer thickness, density, etc., that correspond to the physical parameters of the wellbore from which experimental acoustic data is obtained, the differences and similarities between ideal or modeled dispersion curves and experimental dispersion curves contain information about non-idealities of the wellbore.

At block 510, the dispersion curve generator optionally adjusts the modeling parameters to generate dispersion curves that match the measured dispersion curves. For experimental wellbores or formations with unknown properties, the dispersion curve generator can iteratively adjust modeling parameters and generated dispersion curves until experimental dispersion curves match modeled dispersion curves to within a pre-selected percentage or weighted average difference. When modeled dispersion curves accurately reflect experimental dispersion curves, the modeling parameters can be assumed to match the experimental parameters. The dispersion curve generator can more accurately adjust a single parameter or parameters for a single layer at a time—for instance the modeling parameters of the wellbore tool and mud should be relatively well known allowing for iterative matching focusing on the formation parameters.

Figure 6:
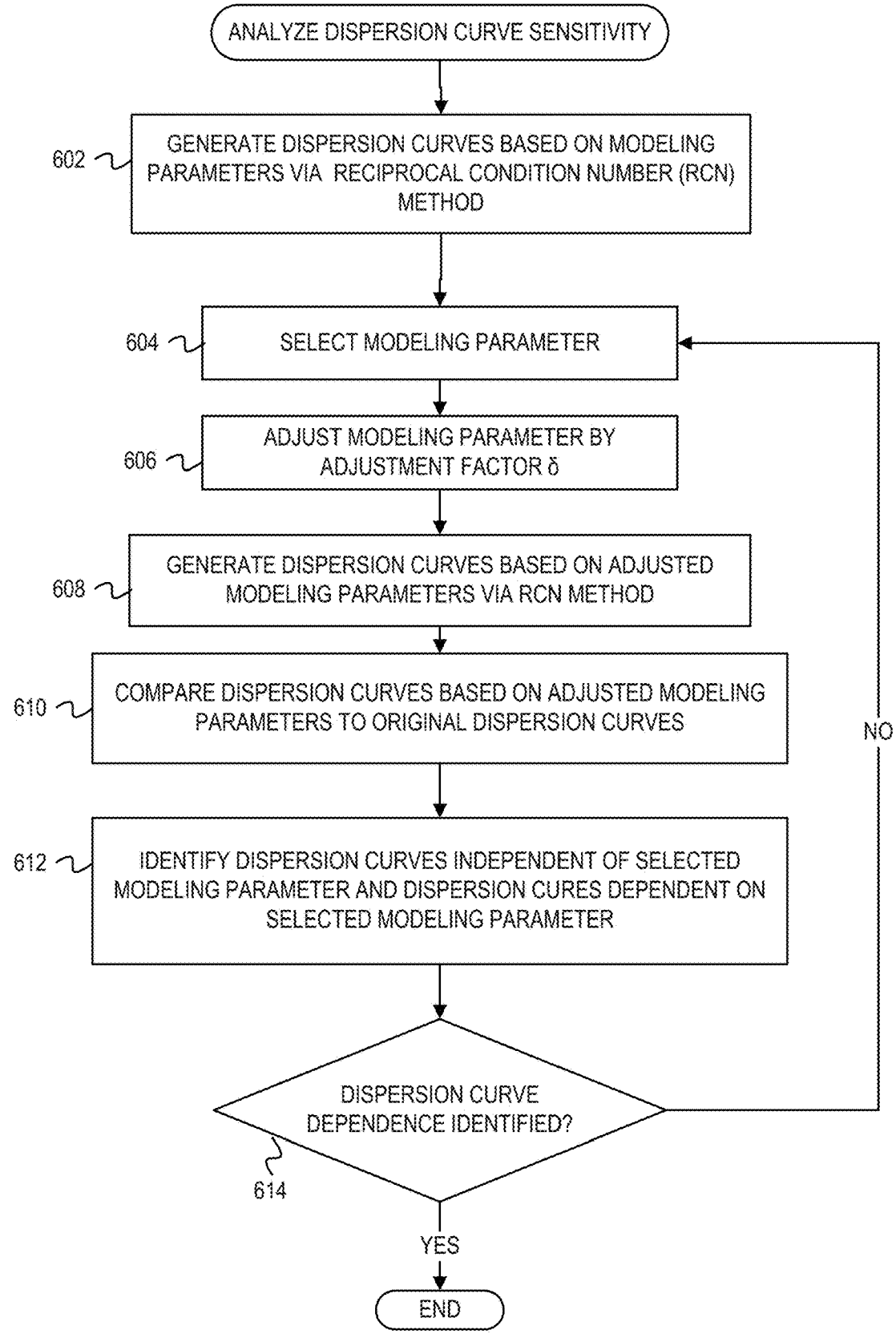
FIG. 6 is a flowchart of example operations for analyzing dispersion curve sensitivity to modeling parameters.

FIG. 6 is a flowchart of example operations for analyzing dispersion curve sensitivity to modeling parameters. The dispersion curve sensitivity analyzer generates dispersion curves based on modeling parameters and then determines which curves are dependent on a selected parameter (and consequently which curves are independent or nearly independent of the selected parameter). The dispersion curve sensitivity analyzer can be a module or portion of the dispersion curve generator or can be a separate program or logical controller based on the RCN method, the determinant method, or another method of generating modeled dispersion curves.

At block 602, the dispersion curve sensitivity analyzer generates a first set of dispersion curves based on the model, which may include a wellbore, wellbore tool, and formation, the modeling parameters for the included layers, and a selected method. The RCN method, as detailed previously, can be used to solve for the wave equations based on the radially layered model, boundary conditions, and the matrix M containing the linear equations of the solution. Optionally, the dispersion curves can be generated via another method, such as the determinant method.

At block 604, the dispersion curve sensitivity analyzer selects a modeling parameter of interest for analysis. The modeling parameter can be any of the parameters necessary to generate the model: thickness, density, radius, shear slowness, compressional slowness, shear velocity, compressional velocity, quality factor, etc. Each of these modeling parameters for each of the layers of the model can be selected for adjustment. The selected parameters can be chosen via user input, via a predetermined routine, or from a selected group of the most relevant parameters. For instance, if the dispersion curve sensitivity analysis is generated during the design of a wellbore tool, the wellbore tool dimensions and materials can be chosen for sensitivity analysis. If the modeled dispersion curves are intended for comparison with field measured dispersion curves and the wellbore tool parameters are known, the formation shear slowness and compressional slowness may be the more relevant factors in order to determine if the model is in agreement with the experimental system.

At block 606, the dispersion curve sensitivity analyzer adjusts the selected parameter of interest by an adjustment factor $\delta$. The adjustment factor $\delta$ can be a percentage, such as 1%, or fractional adjustment amount for a material parameter or an amount, such as 1 mm or a machining tolerance for a thickness in the wellbore tool. The adjustment factor $\delta$ can be input for each selected parameter or can be input for all parameters (for example as a percentage) at once. The adjustment factor $\delta$ need not maintain consistency with known material properties. For example, an inner steel shear slowness adjusted by ±1% may not correspond to a real-world value for shear slowness in steel. The adjustment factor, while small, may move the modeling parameter out of the expected value range for the selected parameter. Because the dispersion curve sensitivity analyzer uses the adjustment factor to track dependence rather than refine dispersion curves, the non-ideality introduced by the adjustment factor does not affect the reliability of the originally generated dispersion curves.

At block 608, the dispersion curve sensitivity analyzer generates dispersion curves, via the RCN method or another method, based on the adjusted modeling parameters. The dispersion curve generation follows the same method as used to generate the original dispersion curves.

At block 610, the dispersion curve sensitivity analyzer compares the original dispersion curves to the dispersion curves generated based on the adjusted modeling parameters. The dispersion curve sensitivity analyzer subtracts the original dispersion curves from the dispersion curves based on the adjusted modeling parameter or parameters. Alternatively, the dispersion curves based on the adjusted modeling parameters can be subtracted from the original dispersion curves, or the absolute value of the difference between the original dispersion curves and the dispersion curves based on the adjusted modeling parameter can be used. The subtraction occurs as a function of the RCN value, where the RCN value is mapped to the slowness versus frequency space to create a two-dimensional function where RCN=f ($\omega$, $\Delta T$). When the RCN method is used to generate the dispersion curves, the RCN values at a particular data point (i.e. a value of slowness and frequency) can be directly subtracted. This is because the RCN method generates dispersion curves with relatively comparable intensities and a steady or smooth background outside of the dispersion curves. The dispersion curve intensity is even over dispersion curves resulting from different modes—i.e. the Stoneley dispersion curve has approximately the same intensity as the formational shear head wave. The adjustment factor δ, being small, does not significantly affect the magnitude of either the dispersion curve or the background.

If a method other than the RCN method is used to generate the dispersion curves, the adjustment factor δ may affect the magnitude of the dispersion curve. Other methods for generating dispersion curves, such as the determinant method, are not as stable (as shown in Equation 23) and continuous as the RCN method. If the adjustment factor δ greatly changes the intensity or the magnitude of either the dispersion curves or the background, sensitivity analysis becomes more difficult. The method may be repeated with a smaller adjustment factor δ or the dispersion curves may be identified by qualitative means rather than quantitative means such as subtraction.

At block 612, the dispersion curve sensitivity analyzer generates a map of the difference between the original dispersion curves and the dispersion curves based on the adjusted modeling parameter. The curves that appear in the map of the difference are those of the dispersion curves that depend on the selected modeling parameter, as shown in FIG. 4. The dispersion curve sensitivity analyzer can use a direction subtraction of the RCN values, or can generate RCN curves based at each value of frequency ω and then subtract or generate a difference curve corresponding to each value of slowness for a given frequency. Because of the stability of the intensity or magnitude of the dispersion curve and the background in the RCN method, the subtraction of the original dispersion curves, which are values of RCN, should produce a zero intensity background and clearly identify the dispersion curves that are affected by the adjustment factor δ added to the selected modeling parameter. The affected dispersion curves, which appear in the difference map, can be plotted and identified or identified directly from the data set.

At block 614, the dispersion curve sensitivity analyzer determines if the dispersion curve dependence has been identified. This may involve finding at least one parameter that affects each of the dispersion curves, identifying the dispersion curves corresponding to the formation characteristics versus those corresponding to the wellbore tool parameters, or running through a predetermined list of modeling parameters for analysis. If the dispersion curve sensitivity analyzer determines that another parameter remains for analysis, the method flows to block 604 where another modeling parameter is selected. If no parameters remain for analysis, the flow ends and results may be output.

Figure 7:
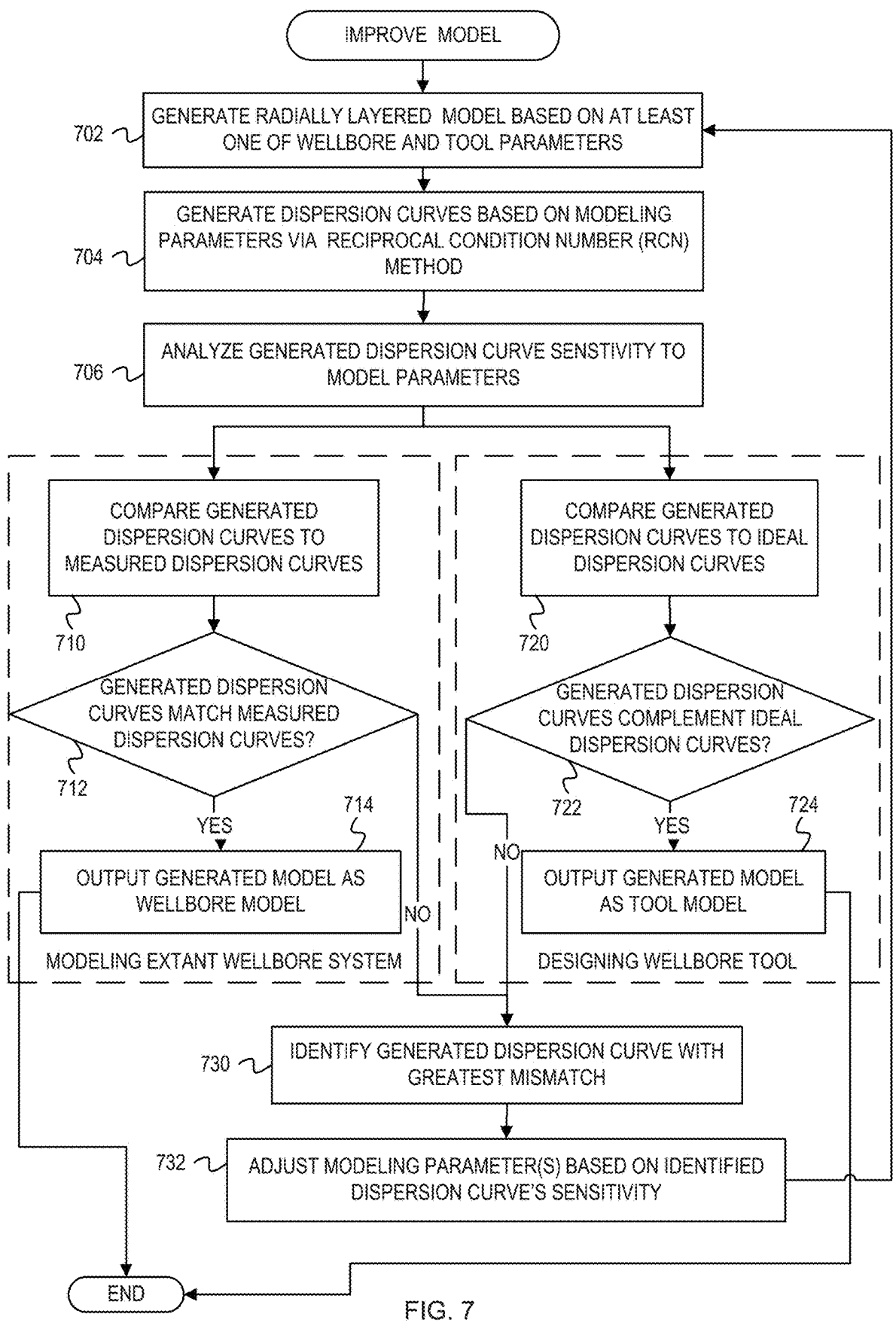
FIG. 7 is a flowchart of example operations for model improvement based on generated dispersion curves.
Figure 8:
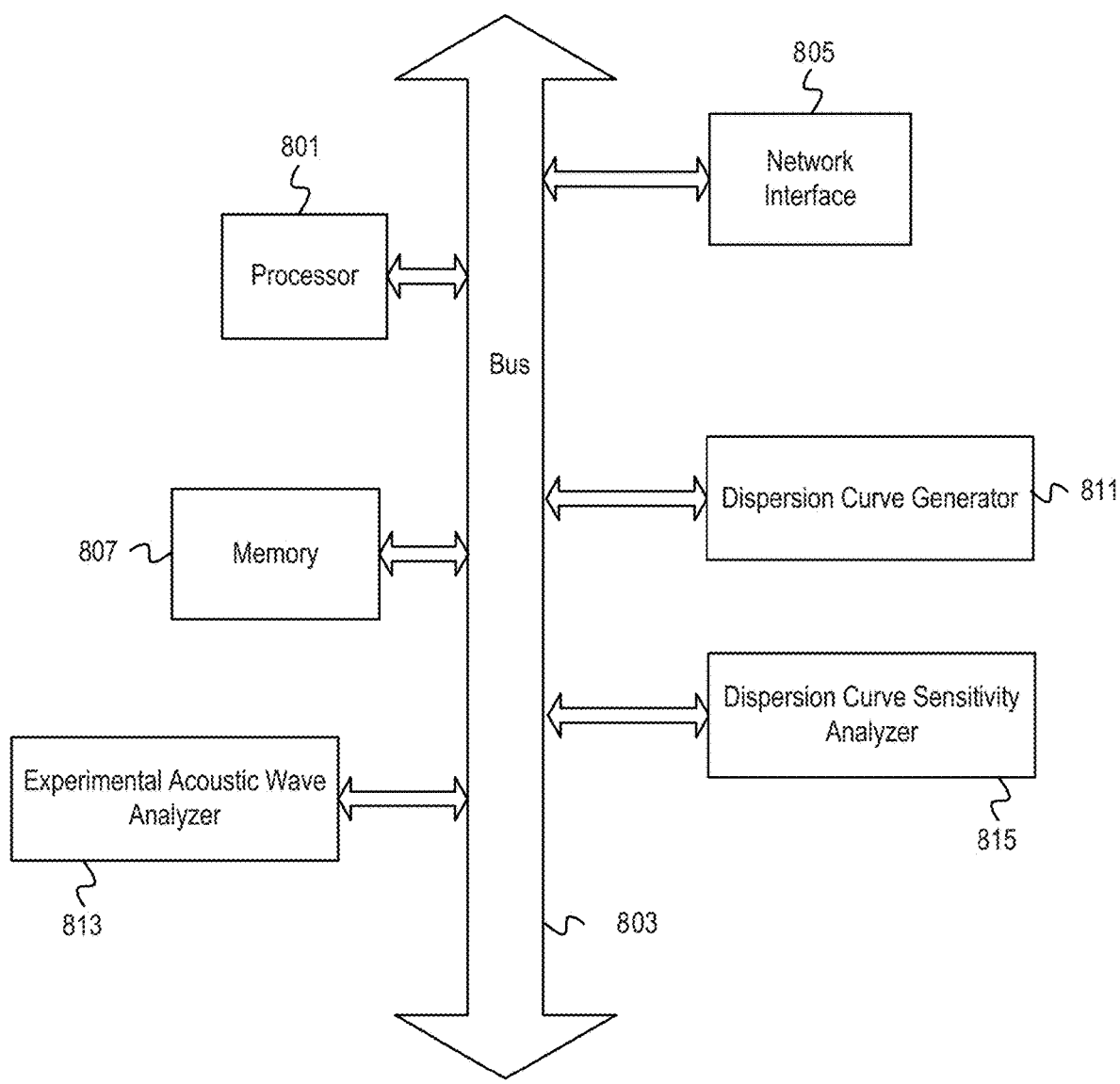
FIG. 8 depicts an example computer, according to some embodiments.

FIG. 7 is a flowchart of example operations for model improvement based on generated dispersion curves. The model optimizer (or model improver) can optionally be included in either the dispersion curve generator or the dispersion curve sensitivity analyzer. The model optimizer can also be a program or programmed controller that includes the dispersion curve generator and the dispersion curve sensitivity analyzer, or part of a program that generates dispersion curves from real world wellbore acoustic data or models and designs wellbore tools, drill strings, or logging while drilling/measurement while drilling (LWD/MWD) tools or equipment. The model optimizer generates and iteratively improves a model, based on either real-world data or ideal acoustic modes.

At block 702, the model optimizer generates a radially layered model of at least one of a wellbore, wellbore fluid, formation, and wellbore tool. The wellbore can be empty and uncased, fully cased, fluid filled, drilling mud filled, etc. and the wellbore fluid can be formation fluid, drilling mud, saltwater, other infiltrates, etc. The formation may be radially symmetric, vertically layered, contain a reservoir, etc. The wellbore tool may be any tool, including a drill string sub, wireline or slickline tool, sonde, retrieval device, bottom hole assembly, sensor, etc. The model may be generated based on known parameters, measured parameters, approximated parameters, or estimated parameters for each of the layers of the model, where such parameters include thickness, density, radius, compressional slowness (or compressional velocity), shear slowness (or shear velocity), quality factor, etc. For parameters that are unknown (such as for unknown formations) or design parameters (for example for tool parameters that can be adjusted before manufacture), the model optimizer can begin iteration within of a preselected range, at an input value, or based on disallowed values. For example, a wellbore tool radius may be constricted to only values acceptable for insertion into cased boreholes or the shear slowness of an inner steel layer may be limited to shear slowness values of potential steel types.

At block 704, the model optimizer generates dispersion curves based on the input model parameters. The model optimizer can generate dispersion curves as shown in FIG. 5. The model optimizer can generate dispersion curves based on the RCN method, as previously described. The model optimizer can also generate dispersion curves based on the determinant method or another method.

At block 706, the model optimizer analyzes the generated dispersion curve to determine the relationship between various parameters and each of the dispersion curves. The model optimizer can analyze dispersion curve sensitivity as shown in FIG. 6. The model optimizer can analyze the relationship between the dispersion curves and each parameter of the model, only adjustable parameters, or all parameters of a selected layer or material. The model optimizer can analyze the dispersion curve sensitivity based on the RCN method, as described, or on another method of dispersion curve generation, such as the determinant method. Flow continues optionally to block 710, if the model optimizer operates on a model of an extant wellbore. Flow continues to block 710 if the model optimizer operates on a model or design for a hypothetical wellbore tool.

For blocks 710-714, the model optimizer operates on a wellbore model, where the wellbore model corresponds to a real-world or experimental wellbore system or formation. At block 710, the model optimizer compares the generated dispersion curves to the measured dispersion curves for the wellbore undergoing modeling. The model optimizer may generate measured dispersion curves based on acoustic data from the wellbore or receive dispersion curves as input. The generated dispersion curves can be compared to the measured dispersion curves via subtraction after an optional normalization or scaling operation, or may be compared via other methods such as weighted averaging, curve fitting, filtering, etc.

At block 712, the model optimizer determines if the generated dispersion curves match the measured dispersion curves. The model optimizer can determine that the curves match based on a minimum error calculated from the comparison of block 712, or can determine that a maximum number of iterations have been reached. The model optimizer can also identify, for each modeling parameter, the modeling parameter that corresponds to minimum difference or error between the generated dispersion curves and the measured dispersion curves. The model optimizer can optimize over each parameter individual or over multiple parameters in a multi-dimensional optimization. If the model optimizer determines that the model matches the measured dispersion curves, flow continues to block 714. If the model optimizer determines that the model does not match the measured dispersion curves, flow continues to block 730 where the model is iteratively adjusted.

At block 714, the model (of the current iteration) is output as the model of the wellbore system. The model parameters, including formation parameter, etc. are output as the optimum model of the wellbore system. The model of the wellbore can then be compared to experimental knowledge of the measured wellbore in order to identify formation parameters, information about the formation, or to perform quality control or other analysis of the acoustic source and measurement system.

For blocks 720-724, the model optimizer operates on a model of a potential wellbore tool or component, including drilling mud, injection fluid, etc. At block 720, the model optimizer compares the generated dispersion curves to the ideal dispersion curves or a set of ideal dispersion curves. The model optimizer can generate a set of ideal dispersion curves based on a set of formation parameters, a set of formation models, or a set of various wellbore models with varying parameters. The generated dispersion curves can be compared to the ideal dispersion curves via subtraction, weighted averaging, filtering, etc. If both the ideal dispersion curves and the generated dispersion curves are produced via the RCN method (as described above), the model optimizer can compare the generated dispersion curves to the ideal dispersion curves via subtraction.

The model optimizer can alternatively generate a set of excluded or disallowed vibrations or area in the slowness-frequency plane. This method can be used to design wellbore tools with resonant frequencies, shear slowness, etc. that do not interfere with measurement of the formation parameters or induce unwanted acoustic vibration in the drill string, fiber optic cables, etc. If the model optimizer is operating on exclusion, the model optimizer can compare the generated dispersion curves to the allowed areas or can determine if any of the generated dispersion curves appear in or cross into the excluded areas.

At block 722, the model optimizer determines if the generated dispersion curves complement the ideal dispersion curves. The model optimizer can determine that the generated dispersion curves match any of a set of allowed dispersion curves, such as through a minimum error calculation or other method as described for block 712, or that the generated dispersion curves avoid the excluded areas of the slowness-frequency plane. The model optimizer can determine that no local minima of the RCN method lie within the excluded areas or that the percentage, intensity, or length of dispersion curves within the excluded area is sufficiently small or below a minimum amount. If the generated dispersion curves complement the ideal dispersion curves, the flow continues to block 724. If the generated dispersion curves do not match the ideal dispersion curves or conflict with the excluded modes or vibrations (i.e. the excluded areas in the slowness-frequency plane), flow continues to block 730.

At block 724, the model optimizer outputs the current model of the wellbore tool or wellbore system. The model optimizer can determine that a potential wellbore tool design or drilling fluid is acoustically appropriate, and the wellbore tool design can be output as an allowable design. The model optimizer can also determine and output an allowable or optimal value or range for one or more model parameters for wellbore design. The model optimizer outputs the model of the current iteration.

At block 730, the model optimizer identifies the generated dispersion curve with the greatest mismatch to the measured dispersion curve or the ideal dispersion curve. Flow enters block 730 from both the optimization based on measured dispersion curves (for an extant wellbore) and the optimization based on ideal dispersion curves (for a potential wellbore or tool). The model optimizer, based on the comparison previously performed between the generated dispersion curves and either the measured dispersion curves or the ideal dispersion curves or exclusion regions, identifies the dispersion curve with the greatest error or mismatch. The largest mismatch can be determined by distance between dispersion curves in the slowness-frequency plane, by a lack of a specific dispersion curve in one of the sets, or by dispersion curve divergence. The model optimizer identifies, based on the dispersion curve sensitivity analysis, the modeling parameters that affect the mismatched generated dispersion curve.

At block 732, the model optimizer adjusts the modeling parameter(s) corresponding to the mismatched generated dispersion curve. The model optimizer can restrict the adjustment to correspond to a physically realistic value (as is not required during the sensitivity analysis). The model optimizer can adjust one parameter at a time, or parameter(s) belonging to a single layer or material together—for example changing the density, shear slowness, and compressional slowness of a steel layer together as would correspond to changing from one type of steel to another when designing a wellbore tool. Once the parameter has been adjusted, flow continues to block 702 where the model is recalculated based on the new parameters. The model optimizer can store the results of each iteration so that the closest approximation of the generated dispersion curves to the measured dispersion curves or ideal dispersion curves can be selected if the iteration limit is reached.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 602 and 604 can be performed in parallel or concurrently. With respect to FIG. 5, a comparison to field-measured dispersion curves is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

FIG. 7 depicts an example computer system with a processor to generate dispersion curves. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system communicates via transmissions to and/or from remote devices via the network interface 705 in accordance with a network protocol corresponding to the type of network interface, whether wired or wireless and depending upon the carrying medium. The system also includes a dispersion curve generator 711 and optional experimental acoustic wave analyzer 713 and dispersion curve sensitivity analyzer 715. The dispersion curve generator 711 generates dispersion curves for the modeled system based on the RCN method previously described. The experimental acoustic wave analyzer 713 determines dispersion curves based on measured acoustic waves in a wellbore and formation. The dispersion curve sensitivity analyzer 715 determines the dependence relationship between generated dispersion curves and modeling parameters. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Embodiment 1: A method comprising: obtaining a matrix M of functions based, at least in part, on first acoustic wave equations for an m layer system corresponding to a combination of a formation and a wellbore in the formation; determining at least one of a condition number and a reciprocal condition number of the matrix M as a function of frequency and slowness; and generating dispersion curves as a function of frequency and slowness based on local minima of the reciprocal condition number of the matrix M.

Embodiment 2: The method of embodiment 1 further comprising: perturbing a first modeling parameter for the m layer system by a first adjustment factor, wherein a first perturbed m layer system corresponds to perturbing the first modeling parameter for the m layer system; determining at least one of a condition number and a reciprocal condition number of a perturbed matrix M of functions based, at least in part, on second acoustic wave equations for the first perturbed m layer system as a function of frequency and slowness; subtracting the reciprocal condition number of the matrix M from the reciprocal condition number of the perturbed matrix M' for each frequency and slowness, wherein the reciprocal condition number is an inverse of the condition number; and identifying the dispersion curves corresponding to the first modeling parameter based, at least in part, on values of the subtraction.

Embodiment 3: The method of embodiment 2 further comprising: perturbing a second modeling parameter for the m layer system by a second adjustment factor, wherein a second perturbed m layer system corresponds to perturbing the second modeling parameter; determining at least one of a condition number and a reciprocal condition number of a second perturbed matrix M' of functions based, at least in part, on third acoustic wave equations for the second perturbed m layer system as a function of frequency and slowness; subtracting the reciprocal condition number of the matrix M from the reciprocal condition number of the second perturbed matrix M' for each frequency and slowness; and identifying the dispersion curves corresponding to the second modeling parameter.

Embodiment 4: The method of any one of embodiments 1 to 3 wherein the m layer system further corresponds to a tool.

Embodiment 5: The method of any one of embodiments 1 to 4 wherein the functions of the matrix M comprises functions corresponding to a system of equations of coefficients of a solution to the first acoustic wave equations for the m layer system.

Embodiment 6: The method of any one of embodiments 1 to 5 wherein determining a reciprocal condition number comprises calculating the solution to $$RCN[M] = \frac{1}{(\|M\|_1 \|M^{-1}\|_1)}$$

for each value of frequency and slowness.

Embodiment 7: The method of embodiment 6 wherein the 1-norm of the matrix M comprises the solution to $$\|M\|_1 = \max_{1 \le j \le q} \sum_{i=1}^{q} |m_{ij}|$$

for each value of frequency and slowness.

Embodiment 8: The method of embodiment 6 wherein the 1-norm of the inverse of the matrix M comprises at least one of the approximation $$\|M^{-1}\|_1 \sim \frac{\|y\|_1}{\|x\|_1}$$

or the convex optimization $\phi_s = \max\{\|M^{-1}x\|_1\}$ where $\|x\|^1 = 1$ for each value of frequency and slowness.

Embodiment 9: The method of any one of embodiments 1 to 8 further comprising: comparing the generated dispersion curves to field measured dispersion curves, where the field measured dispersion curves are calculated based, at least in part, on measured acoustic responses.

Embodiment 10: The method of embodiment 9 further comprising: iteratively adjusting a modeling parameter for the m layer system based, at least in part, on minimizing differences between the generated dispersion curves and the field measured dispersion curves.

Embodiment 11: The method of any one of embodiments 1 to 8 further comprising: designing at least one of a wellbore tool, seismic tool, wellbore fluid, or seismic source based, at least in part, on the generated dispersion curves.

Embodiment 12: The method of any one of embodiments 1 to 11, wherein the m layer system comprises at least one of a formation layer, a mud layer, a heavy-slow layer, an outer tool layer, an air layer, an inner tool layer, and a fluid layer.

Embodiment 13: One or more non-transitory machine-readable media comprising program code for generating dispersion curves, the program code to: generate a matrix M of functions based, at least in part, on first acoustic wave equations for an m layer system corresponding to a combination of a formation and a wellbore in the formation; determine at least one of a condition number and a reciprocal condition number of the matrix M as a function of frequency and slowness; and generate dispersion curves as a function of frequency and slowness based on local minima of the reciprocal condition number of the matrix M.

Embodiment 14: The machine-readable media of embodiment 13, further comprising program code to: perturb a first modeling parameter for the m layer system by a first adjustment factor, wherein a first perturbed m layer system corresponds to perturbing the first modeling parameter for the m layer system; determine at least one of a condition number and a reciprocal condition number of a perturbed matrix M of functions based, at least in part, on second acoustic wave equations for the first perturbed m layer system as a function of frequency and slowness; subtract the reciprocal condition number of the matrix M from the reciprocal condition number of the perturbed matrix M for each frequency and slowness, wherein the reciprocal condition number is an inverse of the condition number; and identify the dispersion curves corresponding to the first modeling parameter based, at least in part, on values of the subtraction.

Embodiment 15: The machine-readable media of embodiment 14, further comprising program code to: perturb a second modeling parameter for the m layer system by a second adjustment factor, wherein a second perturbed m layer system corresponds to perturbing the second modeling parameter: determine at least one of a condition number and a reciprocal condition number of a second perturbed matrix M' of functions based, at least in part, on third acoustic wave equations for the second perturbed m layer system as a function of frequency and slowness: subtracting the reciprocal condition number of the matrix M from the reciprocal condition number of the second perturbed matrix M' for each frequency and slowness; and identify the dispersion curves corresponding to the second modeling parameter.

Embodiment 16: The machine-readable media of any of embodiments 13 to 15, wherein program code to determine the reciprocal condition number further comprising program code to: calculate the reciprocal condition number based, at least in part, on $$RCN[M] = \frac{1}{(\|M\|_1 \|M^{-1}\|_1)}$$

for each value of frequency and slowness.

Embodiment 17: The machine-readable media of embodiment 16, further comprising program code to: calculate the reciprocal condition number based, at least in part, on $$\|M\|_1 = \max_{1 \le j \le q} \sum_{i=1}^{q} |m_{ij}|$$

for each value of frequency and slowness.

Embodiment 18: The machine-readable media of embodiment 16, further comprising program code to: calculate the reciprocal condition number based on at least one of an approximation $$\|M^{-1}\|_1 \sim \frac{\|y\|_1}{\|x\|_1}$$

or a convex optimization $\phi_s = \max\{\|M^{-1}x\|_1\}$ where $\|x\|^1=1$ for each value of frequency and slowness.

Embodiment 19: An apparatus comprising: a processor; and a machine-readable medium having program code executable by the processor to cause the apparatus to, generate a matrix M of functions based, at least in part, on first acoustic wave equations for an m layer system corresponding to a formation and wellbore in the formation; determine at least one of a condition number and a reciprocal condition number of the matrix M as a function of frequency and slowness; and generate dispersion curves as a function of frequency and slowness based on local minima of the reciprocal condition number of the matrix M.

Embodiment 20: The apparatus of embodiment 19, further comprising program code to: perturb a first modeling parameter for the m layer system by a first adjustment factor, wherein a first perturbed m layer system corresponds to perturbing the first modeling parameter for the m layer system; determine at least one of a condition number and a reciprocal condition number of a perturbed matrix M of functions based, at least in part, on second acoustic wave equations for the first perturbed m layer system as a function of frequency and slowness; subtract the reciprocal condition number of the matrix M from the reciprocal condition number of the perturbed matrix M' for each frequency and slowness, wherein the reciprocal condition number is an inverse of the condition number; and identify the dispersion curves corresponding to the first modeling parameter based, at least in part, on values of the subtraction.

Embodiment 21: The apparatus of embodiment 20, further comprising program code to: perturb a second modeling parameter for the m layer system by a second adjustment factor, wherein a second perturbed m layer system corresponds to perturbing the second modeling parameter; determine at least one of a condition number and a reciprocal condition number of a second perturbed matrix M' of functions based, at least in part, on third acoustic wave equations for the second perturbed m layer system as a function of frequency and slowness: subtracting the reciprocal condition number of the matrix M from the reciprocal condition number of the second perturbed matrix M' for each frequency and slowness; and identify the dispersion curves corresponding to the second modeling parameter.

Embodiment 22: The apparatus of any one of embodiments 19 to 21, further comprising program code to: calculate the reciprocal condition number based on at least one of $$RCN[M] = \frac{1}{(\|M\|_1 \|M^{-1}\|_1)}, \|M\|_1 = \max_{1 \le j \le q} \sum_{i=1}^{q} |m_{ij}|,$$

an approximation $$\|M^{-1}\|_1 \sim \frac{\|y\|_1}{\|x\|_1},$$

or a convex optimization $\phi_s = \max\{\|M^{-1}x\|_1\}$ where $\|x\|^1=1$ for each value of frequency and slowness.

What is claimed is:

1. A method comprising:
   detecting, by one or more acoustic sensors, acoustic waves within a formation;
   obtaining, by a dispersion curve generator, a matrix M of functions based, at least in part, on first acoustic wave equations for an m layer system corresponding to a combination of the formation and a wellbore in the formation, wherein the first acoustic wave equations represent the acoustic waves;
   determining, by the dispersion curve generator, at least one of a condition number and a reciprocal condition number of the matrix M as a function of frequency and slowness;
   generating, by the dispersion curve generator, dispersion curves as a function of frequency and slowness based on local minima of the reciprocal condition number of the matrix M; and
   determining one or more petrophysical properties of the formation based on the dispersion curves.

2. The method of claim 1 further comprising:
   perturbing a first modeling parameter for the m layer system by a first adjustment factor, wherein a first perturbed m layer system corresponds to perturbing the first modeling parameter for the m layer system;
   determining at least one of a condition number and a reciprocal condition number of a perturbed matrix M of functions based, at least in part, on second acoustic wave equations for the first perturbed m layer system as a function of frequency and slowness;
   subtracting the reciprocal condition number of the matrix M from the reciprocal condition number of the perturbed matrix M' for each frequency and slowness, wherein the reciprocal condition number is an inverse of the condition number; and
   identifying the dispersion curves corresponding to the first modeling parameter based, at least in part, on values of the subtraction.

3. The method of claim 2 further comprising:
   perturbing a second modeling parameter for the m layer system by a second adjustment factor, wherein a second perturbed m layer system corresponds to perturbing the second modeling parameter;
   determining at least one of a condition number and a reciprocal condition number of a second perturbed matrix M' of functions based, at least in part, on third acoustic wave equations for the second perturbed m layer system as a function of frequency and slowness;
   subtracting the reciprocal condition number of the matrix M from the reciprocal condition number of the second perturbed matrix M' for each frequency and slowness; and
   identifying the dispersion curves corresponding to the second modeling parameter.

4. The method of claim 1 wherein the m layer system further corresponds to a tool.

5. The method of claim 1 wherein the functions of the matrix M comprise functions corresponding to a system of equations of coefficients of a solution to the first acoustic wave equations for the m layer system.

6. The method of claim 1 wherein determining a reciprocal condition number comprises calculating a solution to $$RCN[M] = \frac{1}{(\|M\|_1 \|M^{-1}\|_1)}$$

for each value of frequency and slowness.

7. The method of claim 6 wherein at least one of a 1-norm of the matrix M comprises a solution to $$\|M\|_1 = \max_{1 \leq j \leq q} \sum_{i=1}^{q} |m_{ij}|$$

for each value of frequency and slowness, and
a 1-norm of an inverse of the matrix M comprises at least one of an approximation $$\|M^{-1}\|_1 \sim \frac{\|y\|_1}{\|x\|_1}$$

or a convex optimization $\phi_s = \max\{\|M^{-1}x\|_1\}$ where $\|x\|^1 = 1$ for each value of frequency and slowness.

8. The method of claim 1 further comprising:
comparing the generated dispersion curves to field measured dispersion curves, where the field measured dispersion curves are calculated based, at least in part, on measured acoustic responses.

9. The method of claim 8 further comprising:
iteratively adjusting a modeling parameter for the m layer system based, at least in part, on minimizing differences between the generated dispersion curves and the field measured dispersion curves.

10. The method of claim 1 further comprising:
designing at least one of a wellbore tool, seismic tool, wellbore fluid, or seismic source based, at least in part, on the generated dispersion curves.

11. The method of claim 1, wherein the m layer system comprises at least one of a formation layer, a mud layer, a heavy-slow layer, an outer tool layer, an air layer, an inner tool layer, and a fluid layer.

12. One or more non-transitory machine-readable media comprising program code for generating dispersion curves, the program code to:
detect, by one or more acoustic sensors, acoustic waves within a formation;
generate, by a dispersion curve generator, a matrix M of functions based, at least in part, on first acoustic wave equations for an m layer system corresponding to a combination of the formation and a wellbore in the formation, wherein the first acoustic wave equations represent the acoustic waves;
determine, by the dispersion curve generator, at least one of a condition number and a reciprocal condition number of the matrix M as a function of frequency and slowness;
generate, by the dispersion curve generator, dispersion curves as a function of frequency and slowness based on local minima of the reciprocal condition number of the matrix M; and
determine one or more petrophysical properties of the formation based on the dispersion curves.

13. The machine-readable media of claim 12, further comprising program code to:
perturb a first modeling parameter for the m layer system by a first adjustment factor, wherein a first perturbed m layer system corresponds to perturbing the first modeling parameter for the m layer system;
determine at least one of a condition number and a reciprocal condition number of a perturbed matrix M' of functions based, at least in part, on second acoustic wave equations for the first perturbed m layer system as a function of frequency and slowness;
subtract the reciprocal condition number of the matrix M from the reciprocal condition number of the perturbed matrix M' for each frequency and slowness, wherein the reciprocal condition number is an inverse of the condition number; and
identify the dispersion curves corresponding to the first modeling parameter based, at least in part, on values of the subtraction.

14. The machine-readable media of claim 13, further comprising program code to:
perturb a second modeling parameter for the m layer system by a second adjustment factor, wherein a second perturbed m layer system corresponds to perturbing the second modeling parameter;
determine at least one of a condition number and a reciprocal condition number of a second perturbed matrix M' of functions based, at least in part, on third acoustic wave equations for the second perturbed m layer system as a function of frequency and slowness;
subtracting the reciprocal condition number of the matrix M from the reciprocal condition number of the second perturbed matrix M for each frequency and slowness; and
identify the dispersion curves corresponding to the second modeling parameter.

15. The machine-readable media of claim 12, wherein program code to determine the reciprocal condition number further comprising program code to:
calculate the reciprocal condition number based, at least in part, on $$RCN[M] = \frac{1}{(\|M\|_1 \|M^{-1}\|_1)}$$

for each value of frequency and slowness.

16. The machine-readable media of claim 15, further comprising program code to:
calculate the reciprocal condition number based on at least one of $$\|M\|_1 = \max_{1 \leq j \leq q} \sum_{i=1}^{q} |m_{ij}|, \|M^{-1}\|_1 \sim \frac{\|y\|_1}{\|x\|_1},$$

an approximation $$\|M^{-1}\|_1 \sim \frac{\|y\|_1}{\|x\|_1}$$

or a convex optimization $\phi_s = \max\{\|M^{-1}x\|_1\}$ where $\|x\|^1 = 1$ for each value of frequency and slowness.

17. An apparatus comprising:
a processor; and
a machine-readable medium having program code executable by the processor to cause the apparatus to,
detect, by one or more acoustic sensors, acoustic waves within a formation;
generate, by a dispersion curve generator, a matrix M of functions based, at least in part, on first acoustic wave equations for an m layer system corresponding to the formation and a wellbore in the formation, wherein the first acoustic wave equations represent the acoustic waves;

determine, by the dispersion curve generator, at least one of a condition number and a reciprocal condition number of the matrix M as a function of frequency and slowness;

generate, by the dispersion curve generator, dispersion curves as a function of frequency and slowness based on local minima of the reciprocal condition number of the matrix M; and determine one or more petrophysical properties of the formation based on the dispersion curves.

18. The apparatus of claim 17, further comprising program code to:

perturb a first modeling parameter for the m layer system by a first adjustment factor, wherein a first perturbed m layer system corresponds to perturbing the first modeling parameter for the m layer system;

determine at least one of a condition number and a reciprocal condition number of a perturbed matrix M' of functions based, at least in part, on second acoustic wave equations for the first perturbed m layer system as a function of frequency and slowness;

subtract the reciprocal condition number of the matrix M from the reciprocal condition number of the perturbed matrix M' for each frequency and slowness, wherein the reciprocal condition number is an inverse of the condition number; and identify the dispersion curves corresponding to the first modeling parameter based, at least in part, on values of the subtraction.

19. The apparatus of claim 18, further comprising program code to:

perturb a second modeling parameter for the m layer system by a second adjustment factor, wherein a second perturbed m layer system corresponds to perturbing the second modeling parameter;

determine at least one of a condition number and a reciprocal condition number of a second perturbed matrix M' of functions based, at least in part, on third acoustic wave equations for the second perturbed m layer system as a function of frequency and slowness:

subtracting the reciprocal condition number of the matrix M from the reciprocal condition number of the second perturbed matrix M' for each frequency and slowness; and identify the dispersion curves corresponding to the second modeling parameter.

20. The apparatus of claim 17, further comprising program code to:

calculate the reciprocal condition number based on at least one of $$RCN[M] = \frac{1}{(\|M\|_1 \|M^{-1}\|_1)}, \|M\|_1 = \max_{1 \le j \le q} \sum_{i=1}^{q} |m_{ij}|,$$

an approximation $$\|M^{-1}\|_1 \sim \frac{\|y\|_1}{\|x\|_1},$$

or a convex optimization $\phi_s = \max\{\|M^{-1}x\|_1\}$ where $\|x\|^1 = 1$ for each value of frequency and slowness.

* * * * *